United States Patent [19]
Inuzuka et al.

[11] Patent Number: 5,501,642
[45] Date of Patent: Mar. 26, 1996

[54] SHIFT CONTROL SYSTEM FOR VEHICULAR AUTOMATIC TRANSMISSION

[75] Inventors: Takeshi Inuzuka; Masashi Hattori, both of Anjo; Masato Kaigawa, Toyota; Yasuo Hojo, Nagoya; Atsushi Tabata, Okazaki; Kenji Shirai, Mishima, all of Japan

[73] Assignee: Aisin Aw Co., Ltd., Japan

[21] Appl. No.: 335,846

[22] PCT Filed: Mar. 9, 1994

[86] PCT No.: PCT/JP94/00383

§ 371 Date: Feb. 21, 1995

§ 102(e) Date: Feb. 21, 1995

[87] PCT Pub. No.: WO94/21484

PCT Pub. Date: Sep. 29, 1994

[30] Foreign Application Priority Data

Mar. 15, 1993 [JP] Japan ................................. 5-081513

[51] Int. Cl.$^6$ ................................................... B60K 41/04
[52] U.S. Cl. ................................................... 477/107
[58] Field of Search ................................... 477/107, 111

[56] References Cited

U.S. PATENT DOCUMENTS

| | | | |
|---|---|---|---|
| 3,888,142 | 6/1975 | Ziegle | 477/111 |
| 4,226,295 | 10/1980 | Rembold et al. | 477/107 |
| 4,881,428 | 11/1989 | Ishikawa et al. | 477/111 |
| 5,239,894 | 8/1993 | Oikawa et al. | 477/107 |
| 5,301,565 | 4/1994 | Weismann et al. | 477/107 |
| 5,323,667 | 6/1994 | Tweed et al. | 477/107 |
| 5,385,516 | 1/1995 | Grange et al. | 477/107 |

FOREIGN PATENT DOCUMENTS

| | | |
|---|---|---|
| 58-207556 | 12/1983 | Japan . |
| 61-105235 | 5/1986 | Japan . |
| 2-3545 | 1/1990 | Japan . |

*Primary Examiner*—Dirk Wright
*Attorney, Agent, or Firm*—Lorusso & Loud

[57] ABSTRACT

In order to control the engine output timing always properly irrespective of the aging of an automatic transmission, the present invention provides a shift control system for a vehicular automatic transmission, which system comprises: release end detecting means for detecting the release end of a frictional engagement element for a higher gear stage, at a shifting time from higher to lower gear stages; synchronism detecting means for detecting the synchronism between an engine R.P.M. and a rotating element in the automatic transmission at the lower gear stage; and engine output control means for controlling the output of the engine. The aforementioned engine output control means starts the rise control of the engine output, when the release end of the frictional engagement element for the higher gear stage is detected by the release end detecting means, and ends the rise control of the aforementioned engine output when the synchronism between the engine R.P.M. and the rotating element in the automatic transmission at the lower gear stage is detected by the synchronism detecting means.

6 Claims, 25 Drawing Sheets

| Position | | | Solenoid | | | Clutch | | | Brake | | | |
|---|---|---|---|---|---|---|---|---|---|---|---|---|
| | | | S1 | S2 | S3 | C1 | C2 | C0 | B1 | B2 | B3 | B0 |
| D | Auto. | 1ST | O | X | X | O | X | O | X | X | X | X |
| | | 2ND | O | O | X | O | X | O | X | O | X | X |
| | | 3RD | X | O | X | O | O | O | X | O | X | X |
| | | 4TH | X | X | X | O | O | X | X | O | X | O |
| | Manu. | 1ST | O | X | O | O | X | O | X | X | O | X |
| | | 2ND | O | O | O | O | X | O | O | O | X | X |
| S | | 1ST | O | X | X | O | X | O | X | X | X | X |
| | | 2ND | O | O | O | O | X | O | O | O | X | X |
| | | 3RD | X | O | X | O | O | O | X | O | X | X |
| | | (3RD) | X | X | X | O | O | O | X | O | X | X |
| L | | 1ST | O | X | O | O | X | O | X | X | O | X |
| | | 2ND | O | O | O | O | X | O | O | O | X | X |
| | | (1ST) | X | X | X | O | X | O | X | X | O | X |
| Remarks | | | O : ON | | | | | | Apply | | | |
| | | | X : OFF | | | | | | Release | | | |

Manual Switch Signal

| Shift Position | | Manual Switch | | | |
|---|---|---|---|---|---|
| | | FR | RR | LH | RH |
| P R N D | | × | × | × | × |
| Manual Mode Fixed | 4 | × | ○ | × | ○ |
| | 3 | ○ | × | × | ○ |
| | 2 | × | ○ | ○ | × |
| | 1 | ○ | × | ○ | × |
| Shifting Operation Transient | D-Range Control | × | × | × | ○ |
| | | × | × | ○ | × |
| Failure | D-Range Control | × | ○ | ○ | ○ |
| | | ○ | ○ | × | ○ |
| | | × | ○ | × | × |
| | | ○ | × | ○ | ○ |
| | | ○ | × | × | × |
| | | ○ | ○ | ○ | × |
| | | × | × | ○ | ○ |
| | | ○ | ○ | × | × |
| | | ○ | ○ | ○ | ○ |

5,501,642

SHIFT CONTROL SYSTEM FOR VEHICULAR AUTOMATIC TRANSMISSION

TECHNICAL FIELD

The present invention relates to a shift control system for a vehicular automatic transmission.

BACKGROUND ART

In the prior art, there is disclosed in Japanese Patent Laid-Open No. 191238/1987 a structure in which an engine output torque is increased to raise the engine output temporarily at an inertial time by means for increasing the fuel temporarily at a shiftdown time.

However, this Laid-Open has not disclosed in the least what instant of the shiftdown time the timing for raising the engine output temporarily is to be set.

Generally speaking, there is conceived a method by which the timing for raising the engine output temporarily is turned and set beforehand for each of the kinds of vehicles. In this case, it is difficult to adjust the temporary engine output raising timing in advance for the aging of the automatic transmission. If the engine output raising timing is premature at the 2-1 shiftdown, for example, an accelerating state is established at the 2nd speed. If the timing is too late, on the other hand, the returning shock from the negative torque of the inertia is promoted to accelerate the vehicle at the 1st speed.

Therefore, the present invention has an object to provide a system capable of controlling the engine output timing properly at all times irrespective of the aging of the automatic transmission.

DISCLOSURE OF THE INVENTION

In order to solve the above-specified problem, according to the present invention, there is provided a shift control system for a vehicular automatic transmission, which system comprises: release end detecting means for detecting the release end of a frictional engagement element for a higher gear stage, at a shifting time from higher to lower gear stages; synchronism detecting means for detecting the synchronism between an engine R.P.M. and a rotating element in the automatic transmission at the lower gear stage; and engine output control means for controlling the output of the engine, wherein the aforementioned engine output control means starts the rise control of the engine output, when the release end of the frictional engagement element for the higher gear stage is detected by the aforementioned release end detecting means, and ends the rise control of the aforementioned engine output when the synchronism between the engine R.P.M. and the rotating element in the automatic transmission at the lower gear stage is detected by the aforementioned synchronism detecting means.

Thanks to the above-specified construction, according to the present invention, the aforementioned engine output control means starts the rise control of the engine output, when the release end of the frictional engagement element for the higher gear stage is detected by the aforementioned release end detecting means, and ends the rise control of the aforementioned engine output when the synchronism between the engine R.P.M. and the rotating element in the automatic transmission at the lower gear stage is detected by the aforementioned synchronism detecting means, so that the start and end of the engine output rise can be accurately controlled.

As described above according to the present invention, the aforementioned engine output control means starts the rise control of the engine output, when the release end of the frictional engagement element for the higher gear stage is detected by the aforementioned release end detecting means, and ends the rise control of the aforementioned engine output when the synchronism between the engine R.P.M. and the rotating element in the automatic transmission at the lower gear stage is detected by the aforementioned synchronism detecting means, so that the start and end of the engine output rise can be accurately controlled irrespective of the aging of the automatic transmission.

Since, moreover, the synchronism can be detected to start the application of the frictional engagement element for the lower gear stage by the synchronism detecting means, the shift control and the engine output control can be synchronized irrespective of the aging of the automatic transmission.

BRIEF DESCRIPTION OF DRAWINGS

FIG. 3 is a diagram presenting an operation diagram of the automatic transmission of the present invention.

FIG. 14 is a signal diagram of a manual shift switch.

BEST MODE FOR CARRYING OUT THE INVENTION

Figure 1:
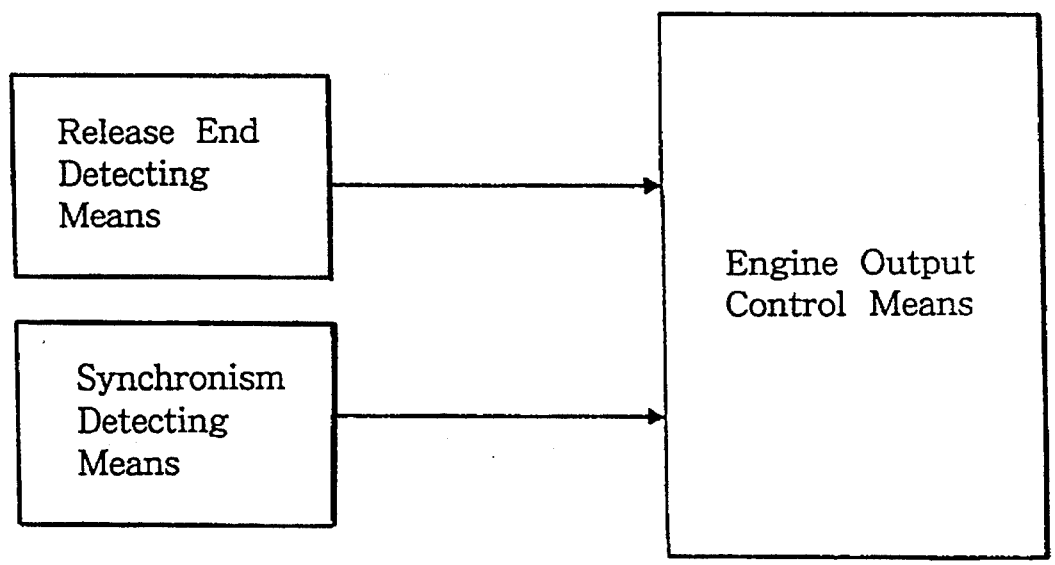
FIG. 1 is a block diagram showing a basic construction of the present invention.
Figure 2:
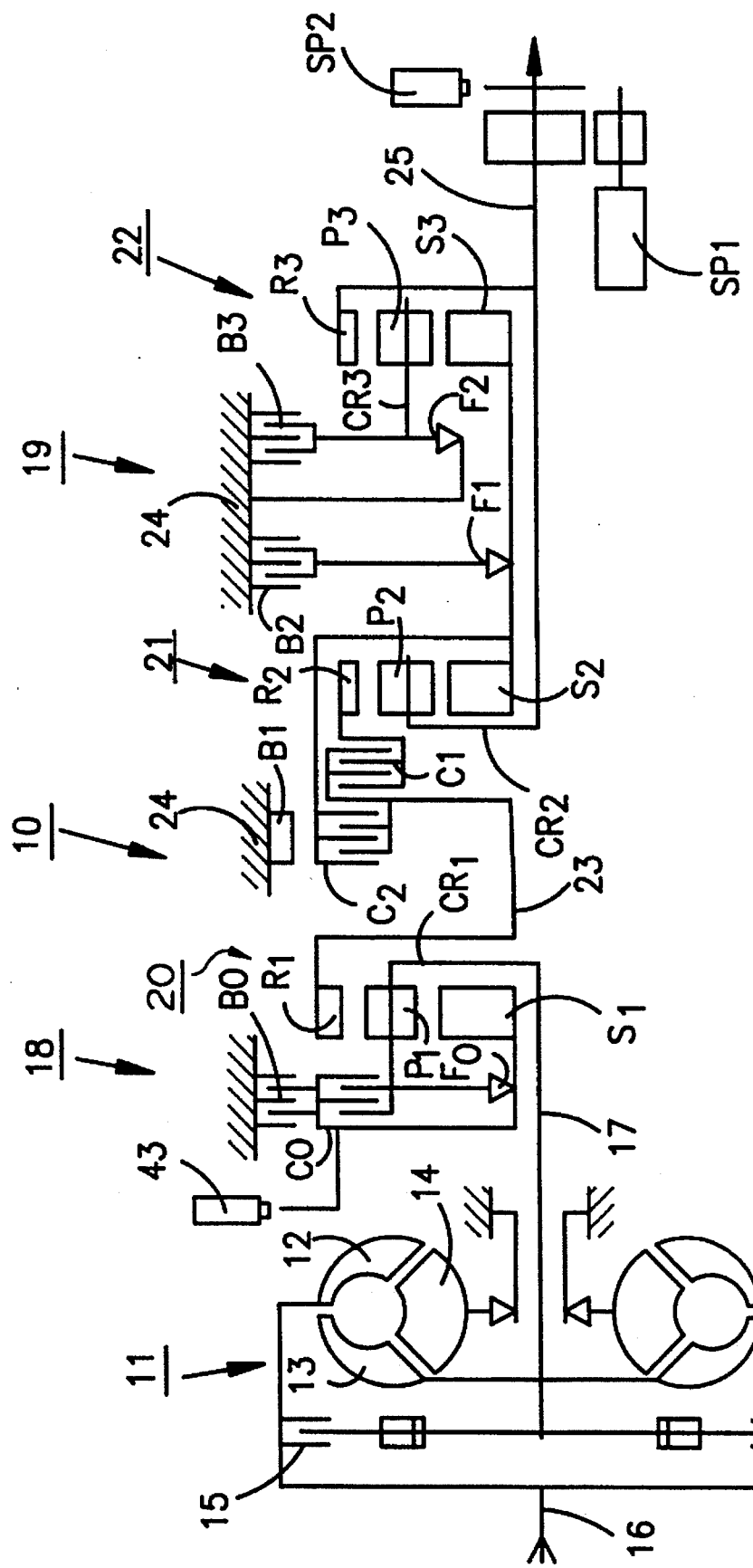
FIG. 2 is a schematic diagram showing an automatic transmission of the present invention.

One embodiment of the present invention will be described in detail in the following with reference to the drawings. FIG. 1 is a block diagram showing a basic construction of the present invention; FIG. 2 is a schematic diagram of an automatic transmission of the present invention; and FIG. 3 is an operation diagram of the automatic transmission of the present invention. In FIG. 2, the automatic transmission is constructed of a transmission 10 and a torque converter 11. The engine rotation is transmitted through the torque converter 11 to the transmission 11 and is shifted by the transmission until it is transmitted to the drive wheels. The aforementioned torque converter 11 is composed of a pump impeller 12, a turbine runner 13, a stator 14 and a lockup clutch 15 for improving a power transmission efficiency so that the rotation of an input member 16 is transmitted to an input shaft 17 of the transmission indirectly through the oil flow in the torque converter 11 and directly by locking the aforementioned lockup clutch 15.

On the other hand, the aforementioned transmission 10 is composed of an auxiliary transmission unit 18 and a main transmission unit 19, of which the auxiliary transmission unit 18 is equipped with an overdrive planetary gear unit 20 whereas the main transmission unit 19 is equipped with a front planetary gear unit 21 and a rear planetary gear unit 22. Here, the aforementioned overdrive planetary gear unit 20 is connected to the input shaft 17 and composed of a carrier $CR_1$ supporting a planetary pinion $P_1$, a sun gear $S_1$ enclosing the input shaft 17, and a ring gear $R_1$ connected to an input shaft 23 of the main transmission unit 19. Moreover, a third clutch C0 and a third one-way clutch F0 are arranged between the carrier $CR_1$ and the sun gear $S_1$, and a fourth brake B0 is arranged between the sun gear $S_1$ and a case 24.

Next, the front planetary gear unit 21 is connected to an output shaft 25 and composed of a carrier $CR_2$ supporting a planetary pinion $P_2$, a sun gear $S_2$ enclosing the output shaft 25 and integrated with a sun gear $S_3$ of the rear planetary gear unit 22, and a ring gear $R_2$ connected to the input shaft 23 through a first clutch C1. Moreover, a second clutch C2 is arranged between the input shaft 23 and the sun gear $S_2$, and a second brake B2 is arranged between the sun gear $S_2$ and the case 24 through a first one-way clutch F1 made of a band brake. Still moreover, the rear planetary gear unit 22 is composed of a carrier $CR_3$ supporting a planetary pinion $P_3$, the sun gear $S_3$, and a ring gear $R_3$ connected to the output shaft 25. A third brake B3 and a second one-way clutch F2 are arranged in parallel between the carrier $CR_3$ and the case 24. Incidentally, numeral 43 designates an input R.P.M. sensor, and characters SP1 and SP2 designate vehicle speed sensors.

The individual solenoid valves S1, S2 and S3, clutches C0, C1 and C2, and the brakes B0, B1, B2 and B3 of the automatic transmission described above are individually controlled, as tabulated in the operation chart of FIG. 3.

Specifically, at the 1st speed in the D-range or S-range, the first solenoid valve S1 is ON so that the third clutch C0 and the first clutch C1 are applied to lock the third one-way clutch F0 and the second one-way clutch F2 whereas the others are released. As a result, the overdrive planetary gear unit 20 is integrated into a direct-coupling state through the third clutch C0 and the third one-way clutch F0 so that the rotation of the input shaft 17 is transmitted as it is to the input shaft 23 of the main transmission unit 19. In this main transmission unit 19, moreover, the rotation of the input shaft 23 is transmitted through the first clutch C1 to the ring gear $R_2$ of the front planetary gear unit 21 and further to the carrier $CR_2$ and the output shaft 25 integrated with said carrier $CR_2$. At the same time, the counter-clockwise rotating force is imparted through the sun gears $S_2$ and $S_3$ to the carrier $CR_3$ of the rear planetary gear unit 22, which is blocked from rotation by the lock of the second one-way clutch F2, so that the planetary pinion $P_3$ revolves on its axis to transmit the power to the ring gear $R_3$ integrated with the output shaft 25.

At the 2nd speed in the D-range, on the other hand, not only the first solenoid valve S1 but also the second solenoid valve S2 is turned ON. As a result, the third clutch C0, the first clutch C1 and the second brake B2 are applied to lock the third one-way clutch F0 and the first one-way clutch F1, whereas the others are released. As a result, the overdrive planetary gear unit 20 are retained in the direct-coupling state so that the rotation of the input shaft 17 is transmitted as it is to the input shaft 23 of the main transmission unit 19. In the main transmission unit 19, the rotation of the input shaft 23 is transmitted through the first clutch C1 to the ring gear R2 of the front planetary gear unit 21 to impart the counterclockwise rotating force to the sun gear $S_2$ through the planetary pinion $P_2$. However, said sun gear $S_2$ is blocked from rotation by the lock of the first one-way clutch F1 caused by the applied second brake B2. As a result, the carrier $CR_2$ is rotated while allowing the planetary pinion $P_2$ to revolve on its axis, so that the rotation of the 2nd speed is transmitted to the output shaft 25 only through the front planetary unit 21.

At the 3rd speed in the D-range and S-range, on the other hand, the first solenoid valve S1 is turned OFF so that the third clutch C0, the first clutch C1, the second clutch C2 and the second brake B2 are applied to lock the third one-way clutch F0 whereas the others are released. As a result, the overdrive planetary unit 20 is in the direct-coupling state. In the main transmission unit 19, on the other hand, the front planetary unit 21 is integrated by the applied first clutch C1 and second clutch C2, so that the rotation of the input shaft 23 is transmitted as it is to the output shaft 25.

In the 4th speed, i.e., the highest gear stage in the D-range, moreover, the second solenoid valve S2 is also turned OFF to apply the first clutch C1, the second clutch C2, the second brake B2 and the fourth brake B0. The main transmission unit 19 is in the direct-coupling state as at the 3rd speed, but the overdrive planetary gear unit 20 is switched to release the third clutch C0 and to apply the fourth brake B0. As a result, the sun gear $S_1$ is locked by the applied fourth brake B0, and the planetary pinion $P_1$ revolves on its axis while the carrier $CR_1$ being rotating to transmit the power to the ring gear $R_1$ so that the overdrive rotation is transmitted to the input shaft 23 of the main transmission unit 19 in the direct-coupling state.

At the time of a downshift, on the other hand: the third clutch C0 is applied whereas the fourth brake B0 is released in the case of a 4-3 shift; the second clutch C2 is released in the case of a 3-2 shift; and the second brake B2 is released in the case of a 2-1 shift.

On the other hand the operations at the 1st speed and 3rd speed in the S-range are similar to those of the aforementioned case of the D-range. At the 2nd speed moreover, not only the first clutch C1, the third clutch C0 and the second brake B2 but also the third solenoid valve S3 are turned ON to apply the first brake B1 so that the sun gear $S_2$ of the main transmission unit 19 is locked to effect the engine braking.

Moreover, the operations at the 2nd speed in the L-range are similar to the aforementioned ones at the 2nd speed in the S-range. At the 1st speed, however, not only the first clutch C1 and the third clutch C0 but also the third solenoid valve S3 are turned ON to apply the third brake B3 so that the carrier $CR_3$ of the rear planetary gear unit 22 is locked to effect the engine braking.

In the manual shift mode, on the other hand; the operations at the 3rd speed and the 4th speed are similar to those in the automatic transmission mode; the operations at the 2nd speed are similar to those at the 2nd speed in the S-range; and the operations at the 1st speed are similar to those at the 1st speed in the L-range.

Figure 4:
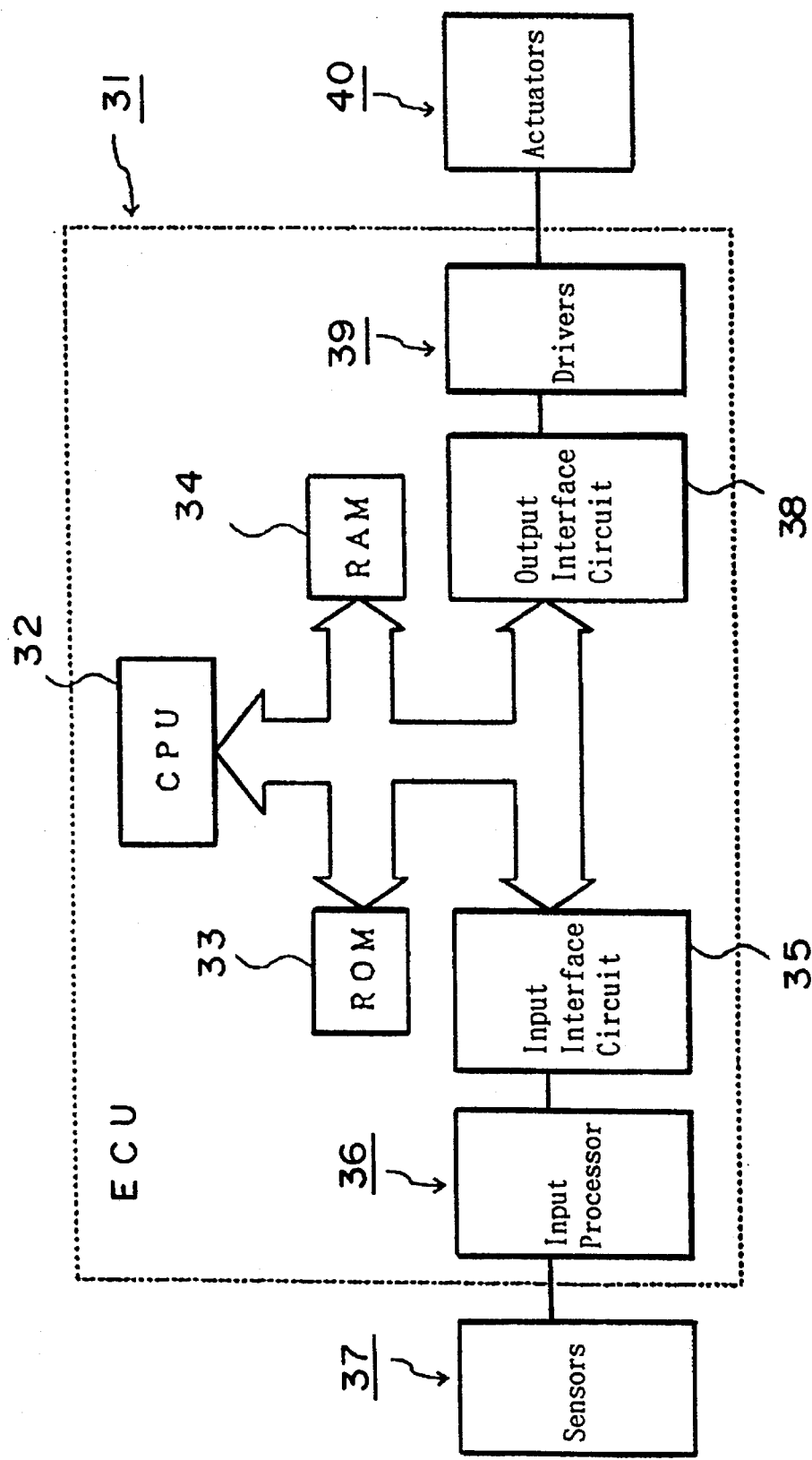
FIG. 4 is a schematic diagram of an automatic shift control system.
Figure 5:
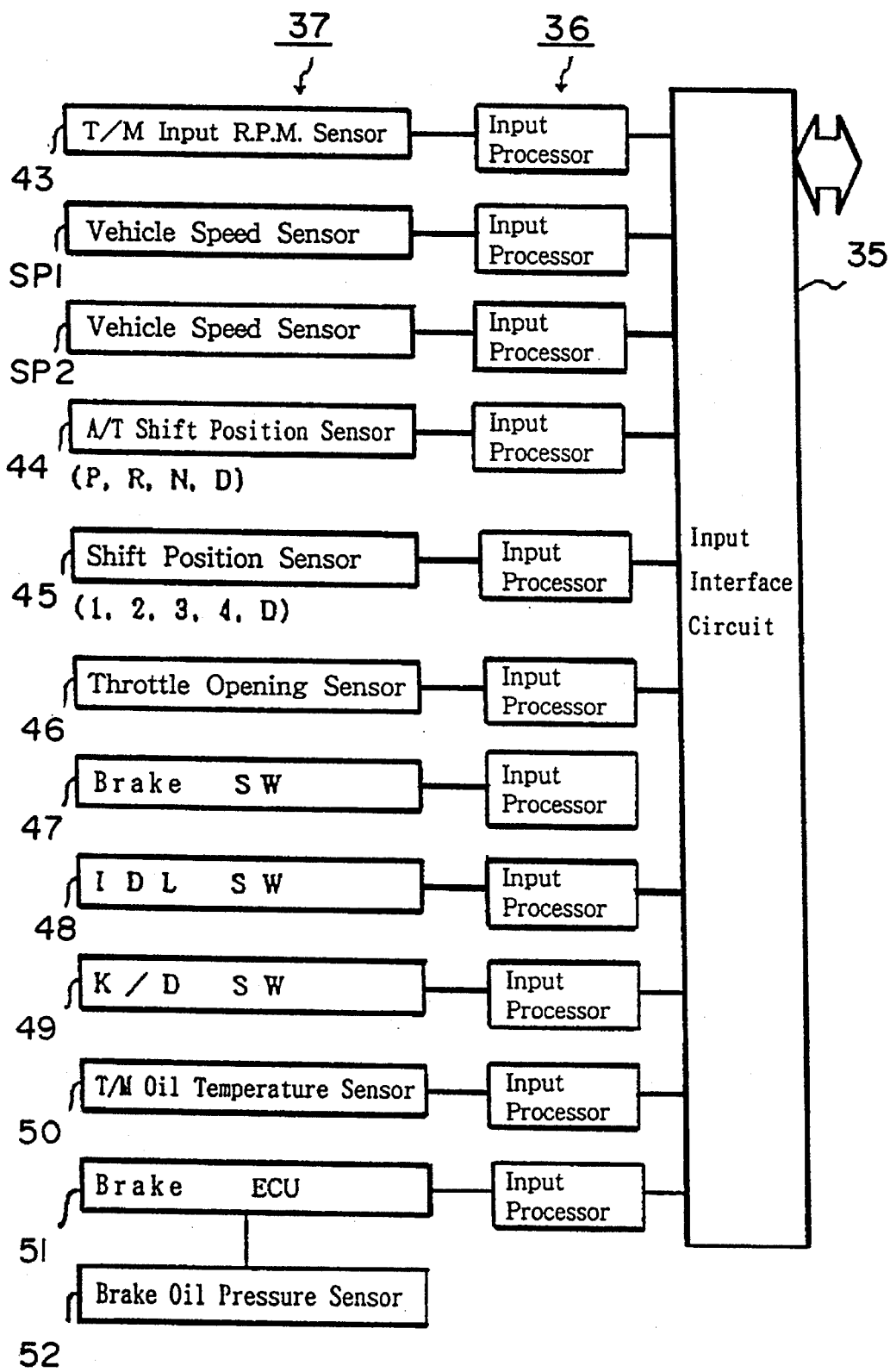
FIG. 5 is an input side block diagram of the automatic shift control system.
Figure 6:
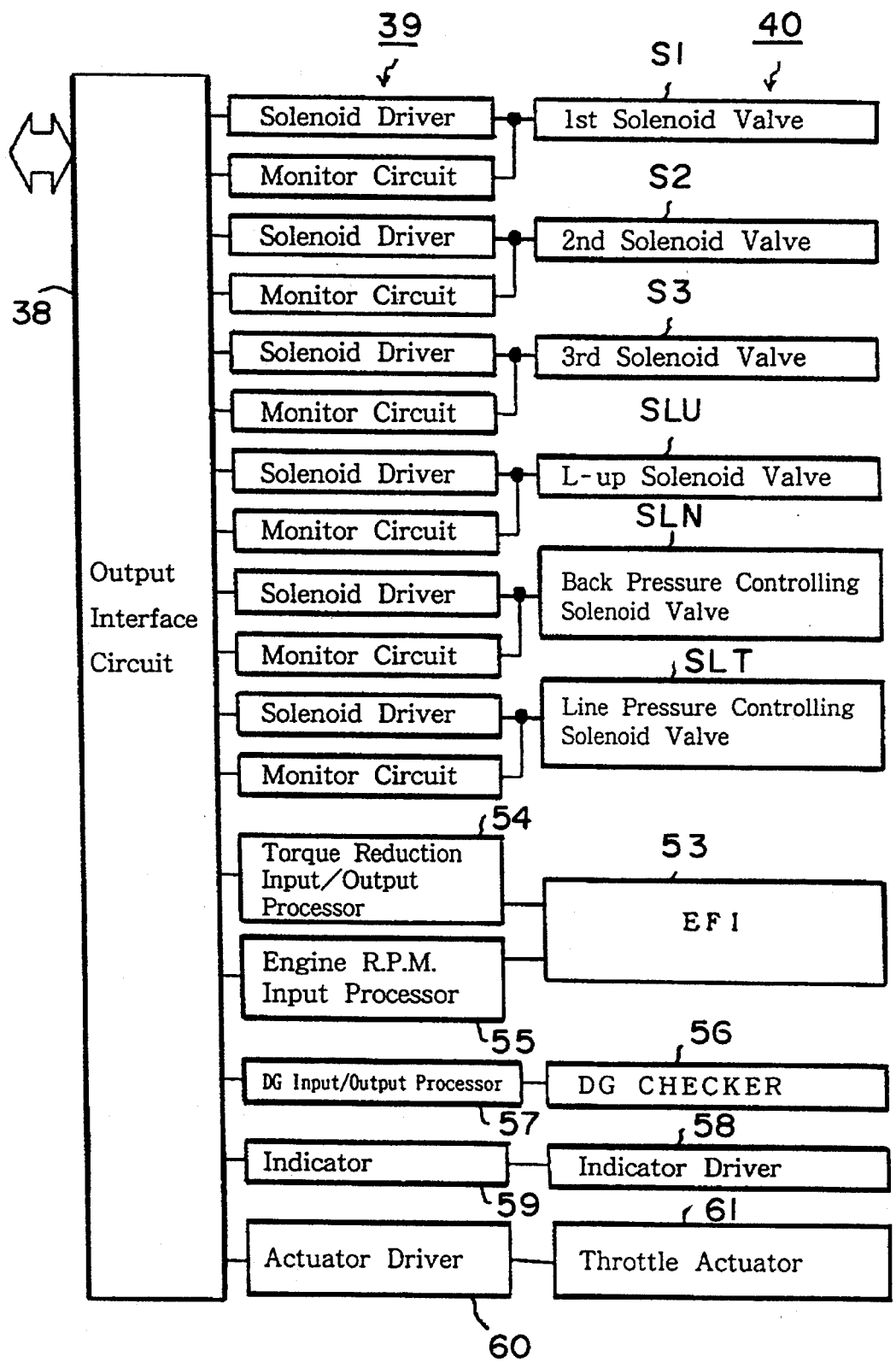
FIG. 6 is an output side block diagram of the automatic shift control system.

Here will be described a control system in the automatic transmission according to one embodiment of the present invention. FIGS. 4, 5 and 6 show the control system of the automatic transmission.

In FIG. 4: numeral 31 designates an automatic transmission control system (ECU) for controlling the automatic transmission as a whole; numeral 32 a CPU; numeral 33 a ROM; numeral 34 a RAM; numeral 35 an input interface circuit; numeral 36 an input process connected with said input interface circuit 35 for processing the inputs of individual signals; and numeral 37 sensors connected with said input processor 36 for outputting individual signals. On the other hand: numeral 38 designates an output interface circuit; numeral 39 drivers connected with said output interface circuit 38 for processing the outputs of individual signals; and numeral 40 an actuator connected with said drivers 39 and adapted to be driven by the output signals.

With reference to FIG. 5, here will be described the input side block diagram of the automatic transmission control system. Numeral 43 designates an input R.P.M. sensor for detecting the R.P.M. of the third clutch C0 of the transmission 10, and characters SP1 and SP2 designate vehicle speed sensors for detecting the R.P.M. of the output shaft 25 of the automatic transmission, of which the vehicle speed sensor SP1 is used as a backup if the vehicle speed sensor SP2 fails and as a speed meter.

Numeral 44 designates a shift position sensor mounted in the transmission 10 for detecting which position in an I-pattern the shift lever selects in the automatic transmission mode (A/T), and numeral 45 a shift position sensor mounted in the shift lever portion for detecting what position in an H-pattern the shift lever selects in the manual shaft mode (M/T).

Moreover: numeral 46 designates a throttle opening sensor mounted in the engine for detecting the throttle opening corresponding to an engine load by a potentiometer; numeral 47 a brake switch mounted in the brake pedal portion for detecting the braking operation; numeral 48 an idling (IDL) switch mounted in the throttle opening sensor 46 for detecting that the accelerator is fully released; numeral 49 a kickdown (K/D) switch mounted in the accelerator pedal portion (or the throttle opening sensor 46) for detecting that the accelerator is fully depressed to require the kickdown; numeral 50 an oil temperature sensor mounted in the transmission 10 for detecting the oil temperature of said transmission 10; numeral 51 a brake electronic control unit (i.e., brake ECU) for outputting downshift signals ($D_3$, $D_2$) in response to a signal coming from a brake oil pressure sensor; and numeral 52 the brake oil pressure sensor for detecting the oil pressure established in the brake piping. The individual sensors 37 described above are connected with individually corresponding input processors 36.

With reference to FIG. 6, here will be described the output side block diagram of the automatic transmission control system. Characters S1, S2 and S3 designate the first, second and third shifting solenoid valves, respectively, which are turned ON/OFF to switch the individual shift valves in accordance with the individual gear stages. Letters SLU designate a linear solenoid valve for the lockup (L-up); letters SLN a linear solenoid valve for controlling the back pressure of the accumulator; and letters SLT a linear solenoid valve for controlling the line pressure. The solenoid drivers 39 generate the voltages or currents for driving those individual solenoid valves S1 to S3 and linear solenoid valves SLU, SLN and SLT and check the operations of the individual solenoid valves S1 to S3 and linear solenoid valves SLU, SLN and SLT thereby to decide the failures for their self-diagnoses.

Numeral 53 designates an engine control unit (EFI) for controlling the engine, and numeral 54 a torque reduction input/output processor for outputting a signal to temporarily reduce the torque produced by the engine, so as to damp the shifting shock at the shifting time. In response to the signal from said torque reduction input/output processor 54, the engine control unit 53 delays the ignition timing or cuts the fuel. Moreover, numeral 55 designates an engine R.P.M. input processor for inputting the engine R.P.M.

Numeral 56 designates a DG CHECKER for outputting a self-diagnosis result at the time of failure of the transmission 10 or the engine control unit 53 by means of an O/D OFF indicator lamp; numeral S7 a DC input/output processor for outputting the self-diagnosis result to said DG CHECKER 56; numeral 58 an indicator such as a mode select lamp or the O/D OFF indicator lamp for indicating the state of the transmission 10; numeral 59 an indicator driver for driving said indicator 58; numeral 60 a throttle actuator for actuating the main throttle electrically; and numeral 61 an actuator driver for driving the throttle actuator.

Figure 7:
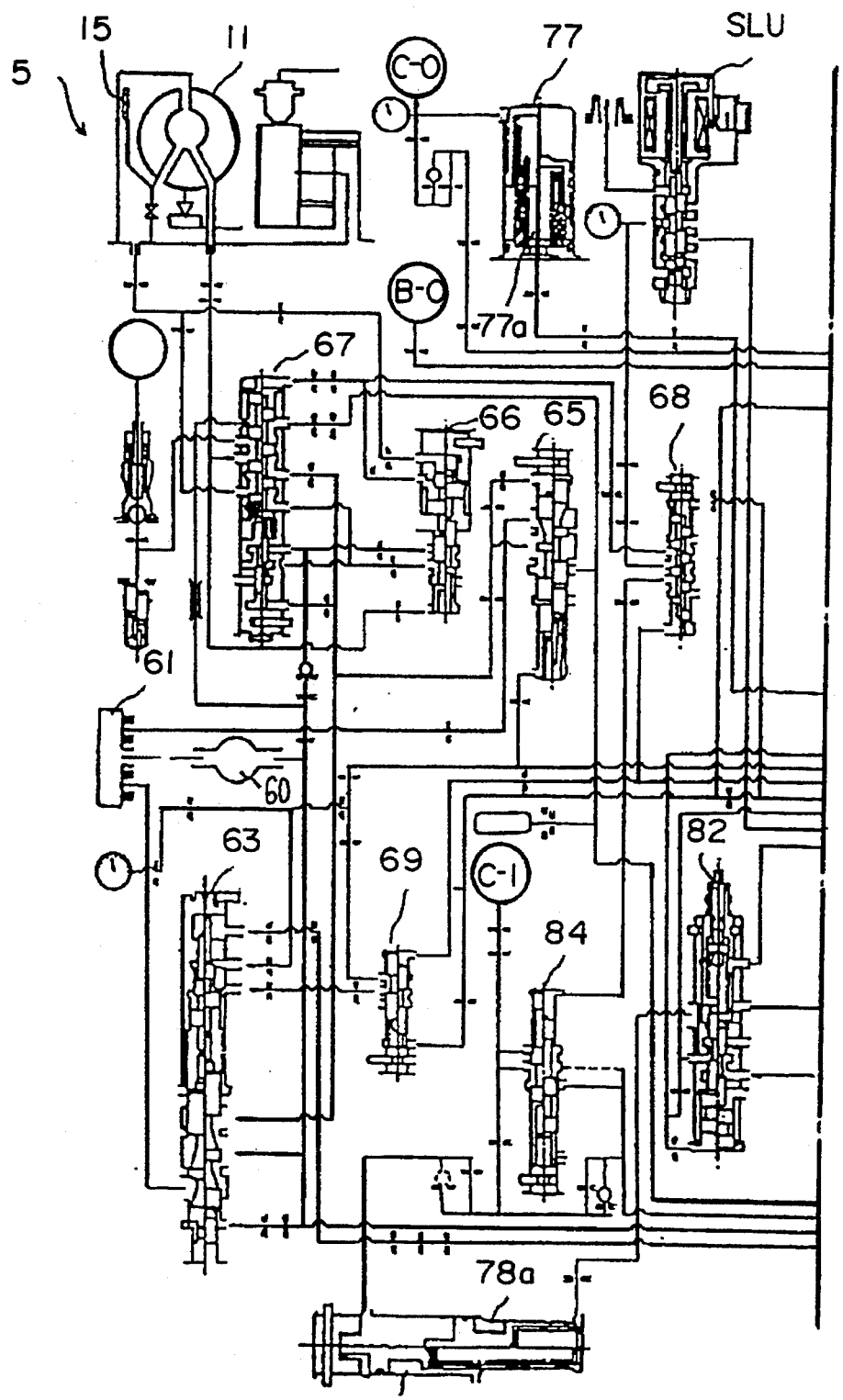
FIG. 7 is a first hydraulic circuit diagram of the automatic transmission of the present invention.
Figure 8:
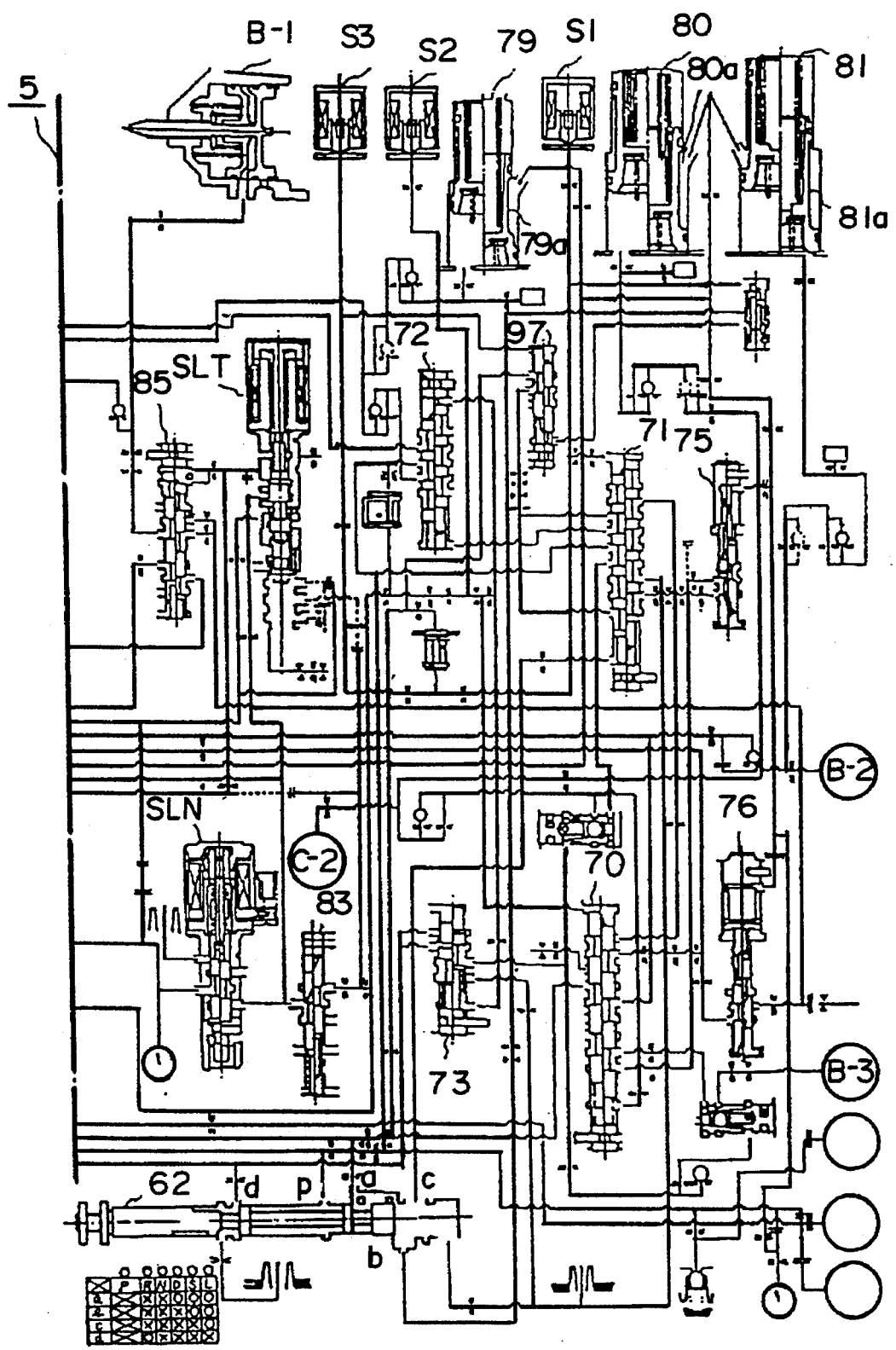
FIG. 8 is a second hydraulic circuit diagram of the automatic transmission of the present invention.

Here will be described the hydraulic control system for the automatic transmission. FIG. 7 is a first hydraulic circuit diagram of the automatic transmission of the present invention, and FIG. 8 is a second hydraulic circuit diagram of the automatic transmission of the present invention. Characters C-0 designate a hydraulic servo for the aforementioned third clutch C0; characters C-1 a hydraulic servo for the aforementioned first clutch C1; characters C-2 a hydraulic servo for the aforementioned second clutch C2; characters B-0 a hydraulic servo for the aforementioned first brake B1; characters B-2 a hydraulic servo for the aforementioned second brake B2; and characters B-3 a hydraulic servo for the aforementioned third brake B3. The numeral 11 designates a torque converter; numeral 60 a hydraulic pump; and numeral 61 a strainer.

Numeral 62 designates a manual valve to be switched by the driver's operation of the shift lever at the time of a shift. This manual valve 62 is connected to the shift lever of the driver's seat through the shift linkage so that it is switched among the individual shift positions P, R, N, D, S and L to provide the communication of a line pressure port p with each of ports a, b, c and d, as indicated at symbol ○ in the chart of FIG. 14. Moreover, numeral 63 designates a primary regulator valve for regulating the line pressure with the throttle modulator pressure and the line pressure at the time of the R-range, to feed the pressure-regulated oil to a lockup relay valve 67 and a secondary regulator valve 65, as will be described in the following. The letters SLT designate the linear solenoid valve for establishing the line pressure corresponding to the output of the engine in accordance with the depression of the accelerator pedal.

The numeral 65 designates the secondary regulator valve for regulating the oil pressure coming from the aforementioned primary regulator valve 63 to feed the regulated oil pressure together with the lubricating oil pressure to the lockup relay valve 67. Numeral 66 a lockup control valve for regulating the oil pressure to be fed to a control oil chamber at the leading end of the lockup relay valve 67. Moreover, this lockup relay valve 67 is actuated by the signal oil pressure coming from the third solenoid valve S3 and a solenoid relay valve 68 to release the lockup clutch 15 of the torque converter 11. Numeral 69 designates a cutback valve for applying a cutback pressure to the primary regulator valve 63 to regulate the line pressure. Said cutback valve 69 is actuated at the time other than the L-range or the R-range by the oil pressure which is fed to the hydraulic servo B-1 and the hydraulic servo B-2.

Numeral 70 designates a 1-2 shift valve for switching the 1st and 2nd speeds. This 1-2 shift valve has its leading end control oil chamber fed with the oil pressure of the second solenoid valve S2 so that it takes a righthand half position at the 1st speed and a lefthand half position at the 2nd, 3rd and 4th speeds. Specifically, the 1-2 shift valve 70 takes the righthand half position at the 1st speed to stop the oil feed to the hydraulic servo B-1 and the hydraulic servo B-2 but feeds the oil to the hydraulic servo B-3 in the L-range and in the manual mode. When the 2nd speed comes, the aforementioned 1-2 shift valve 70 takes the lefthand half position so that the oil pressure from the aforementioned manual valve 62 is fed to the hydraulic servo B-2. In the S-range and the L-range, on the other hand, the 1-2 shift valve 70 receives the oil pressure from a later-described 2-3 shift valve 71 and feeds it to the hydraulic servo B-1 through a second coast modulator valve 76.

On the other hand, the numeral 71 designates the 2-3 shift valve for switching the 2nd speed and the 3rd speed. This 2-3 shift valve 71 has its leading end control oil chamber fed with the oil pressure of the first solenoid valve S1 to start the oil feed to the hydraulic servo C-2, which has been interrupted at the 1st and 2nd speeds, when the 3rd speed comes. Moreover, numeral 72 designates a 3-4 shift valve for switching the 3rd speed and the 4th speed. The 3-4 shift valve 72 has its leading end control chamber fed with the oil pressure of the second solenoid valve S2 so that it takes its righthand half position at the 1st, 2nd and 3rd speeds and its lefthand position at the 4th speed. Specifically, the oil feed, which has been made to the hydraulic servo C-0 at the 1st, 2nd and 3rd speeds, is interrupted when the 4th speed comes so that the 3-4 shift valve 72 takes the lefthand position, but the oil feed to the hydraulic servo B-0, which has been stopped at the 1st, 2nd and 3rd speeds, is restored.

Numeral 73 designates a reverse inhibit valve which is actuated when the second solenoid valve S2 is released at a vehicle speed of 9 Km/h or higher, to interrupt the oil feed to the hydraulic servo C-2. On the other hand, numeral 75 designates a low coast modulator valve, and the numeral 76 designates the second coast modulator valve which is actuated when the engine braking is to be effected.

Each of the aforementioned clutches C0, C1 and C2 and brakes B0 and B2 is equipped with an accumulator. Specifically: numeral 77 designates the accumulator for the third clutch C0; numeral 78 the accumulator for the first clutch C1; numeral 79 the accumulator for the fourth brake B0; numeral 80 the accumulator for the second clutch C2; and numeral 81 the accumulator for the second brake B2. An accumulator valve 82 is provided for regulating the oil pressure to communicate with the individual back pressure chambers 77a, 78a, 79a, 80a and 81a of the aforementioned accumulator 79 for the fourth brake B0, the accumulator 80 for the second clutch C2 and the accumulator 81 for the second brake B2, and for regulating the oil pressures of the low coast modulator 75 and the second coast modulator valve 76. Moreover, numeral 97 designates a coast brake cutoff valve.

Moreover, the first solenoid valve S1 and the second solenoid valve S2 switch and control the 1-2 shift valve 70, the 2-3 shift valve 71 and the 3-4 shift valve 72, as described above. The third solenoid valve S3 switches and controls the coast brake cutoff valve 97. The linear solenoid valves SLU, SLN and SLT are fed with the oil pressure which is regulated by a solenoid modulator valve 83. Moreover, numeral 84 designates an orifice control valve, and numeral 85 designates a cutoff valve.

Incidentally, in the automatic transmission thus constructed, the coast brake cutoff valve 97 for effecting the engine braking selectively is arranged between the manual valve 62 and the 2-3 shift valve 71 and is switched by the third solenoid valve S3 so that the engine braking may be effected at the 1st and 2nd speeds no matter what position the manual valve 62 might take.

Figure 9:
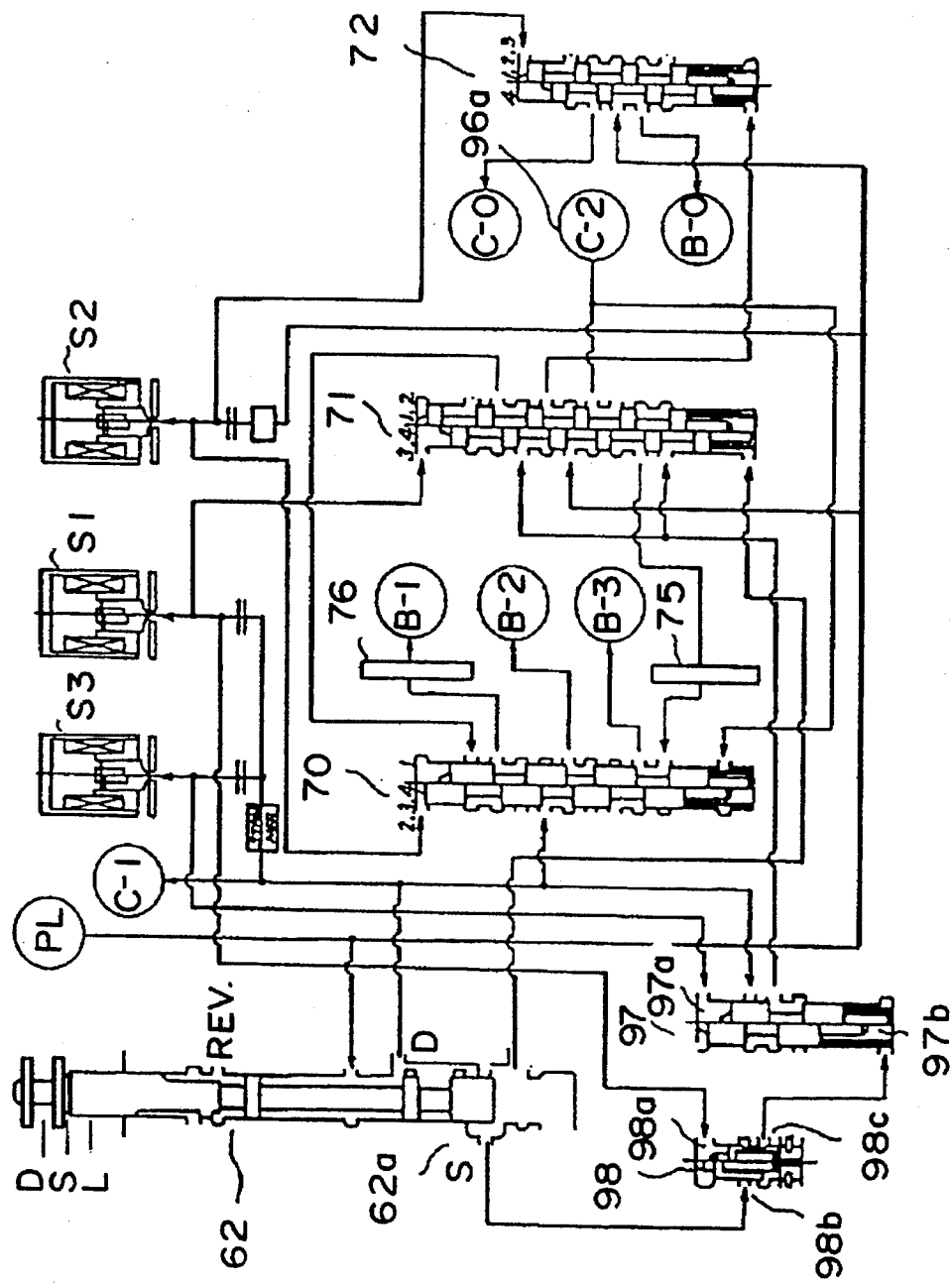
FIG. 9 is a hydraulic circuit diagram showing an essential portion of the automatic transmission of the present invention.

With reference to FIG. 9, here will be described a hydraulic circuit diagram showing an essential portion of the automatic transmission of the present invention. Letters PL designate a supply source of the line pressure, which is varied by controlling the linear solenoid valve SLT, as described above. Moreover, the characters S1 to S3 designate the first, second and third solenoid valves; the letter 62 designates the manual valve; the numeral 70 the 1-2 shift valve; the numeral 71 the 2-3 shift valve; the numeral 72 the 3-4 shift valve; the numeral 75 the low coast modulator valve; and the numeral 76 the second modulator valve. Furthermore, the numeral 97 designates the coast brake cutoff valve which has a first control oil chamber 97a and a second control oil chamber 97b. This coast brake cutoff valve 97 has its oil drained from its first control oil chamber 97a to take a lefthand half position, when the aforementioned third solenoid valve S3 is turned ON, and is fed at its first control oil chamber 97a with the oil to take a righthand half position when the same is turned OFF.

The aforementioned third solenoid valve S3 is turned, as tabulated in the operation chart of FIG. 3, OFF at the 1st to 4th speeds in the D-range in the automatic transmission mode and is turned, in the case of effecting the engine braking, OFF at 1st and 3rd speeds in the S-range and ON at the 2nd speed in the S-range and at the 1st and 2nd speeds in the L-range. In the manual transmission mode, on the other hand, the third solenoid valve S8 is turned ON at the 1st and 2nd speeds and OFF at the 3rd and 4th speeds. In case, however, no engine braking is required at the 1st and 2nd speeds, the third solenoid valve S3 can be turned OFF at the 1st and 2nd speeds. Specifically, in case the engine braking is to be effected at the 1st speed in the manual transmission mode, the aforementioned coast brake cutoff valve 97 takes the lefthand half position so that the oil from the manual valve 62 is fed to the hydraulic servo B-3 through the 2-3 shift valve 71 and the 1-2 shift valve 70 to apply the third brake B3. In case, on the other hand, the engine braking is to be effected at the 2nd speed in the manual transmission mode, the aforementioned coast brake cutoff valve 97 takes the lefthand half position so that the oil from the manual valve 62 is fed to the hydraulic servo B-1 through the 2-3 shift valve 71 and the 1-2 shift valve 70 to apply the first brake.

At the 1st speed in the S-Range in the automatic transmission mode, moreover, the third solenoid valve S3 is turned OFF to make the engine braking ineffective, so that the shift feeling is improved. At the 2nd speed in the S-range and the 1st and 2nd speeds in the L-range of the automatic transmission mode, moreover, the third solenoid valve S3 is turned ON to effect the engine braking.

Incidentally, in the automatic transmission of the present invention, the 1-2 shift valve 70, the 2-3 shift valve 71 and the 3-4 shift valve 72 are switched by turning ON/OFF the first solenoid valve S1 and the second solenoid valve S2. Even if both the aforementioned first solenoid valve S1 and second solenoid valve S2 should electrically fail to OFF, the running can be kept by the fail-safe at a predetermined gear stage. Specifically: the 4th speed can be achieved in the D-range; the 3rd speed in the S-range; and the 1st speed in the L-range. Moreover, in case the running is kept by the aforementioned fail-safe and in case the third solenoid valve S3 electrically fails to OFF, the coast brake cutoff valve 97 has its control oil chamber 97a fed with the signal oil pressure. Between the aforementioned coast brake cutoff valve 97 and manual valve 62, therefore, there is interposed an overdrive lockout valve 98 to prevent the aforementioned coast brake cutoff valve 97 from taking the righthand half position.

Therefore, said overdrive lockout valve 98 has its end control oil chamber 98a connected to the first solenoid valve S1 so that it may take the lefthand half position, when the first solenoid valve S1 is turned OF, and the righthand half position when the same is turned OFF. Moreover, the overdrive lockout valve 98 is formed with ports 98b and 98c and is connected between a port 62a for establishing the S-range pressure of the aforementioned manual valve 62 and the port 98b and between the second control oil chamber 97b of the aforementioned coast brake cutoff valve 97 and the port 98b. As a result, when the aforementioned third solenoid valve S3 electrically fails to OFF, simultaneously as the aforementioned coast brake cutoff valve 97 has its first control oil chamber 97a fed with the signal oil pressure, the first solenoid valve S1 is turned OFF to feed the oil to the control oil chamber 98a of the aforementioned overdrive lockout valve 98 and to communicate with the ports 98b and 98c so that the S-range pressure is fed to the second control oil chamber 97b. Thus, the coast brake cutoff valve 97 takes the lefthand half position.

In these ways, the hydraulic servo B-1 and the hydraulic servo B-3 can be fed with the oil to effect the engine braking. Incidentally, the aforementioned first solenoid valve S1 is turned ON at the 1st and 2nd speeds and OFF at the 3rd and 4th speeds. In the case of normal operations, therefore, the aforementioned ports 98b and 98c are shut off at the 1st and 2nd speeds so that the coast brake cutoff valve 97 is switched in response to the ON/OFF of the third solenoid valve S3.

Figure 10:
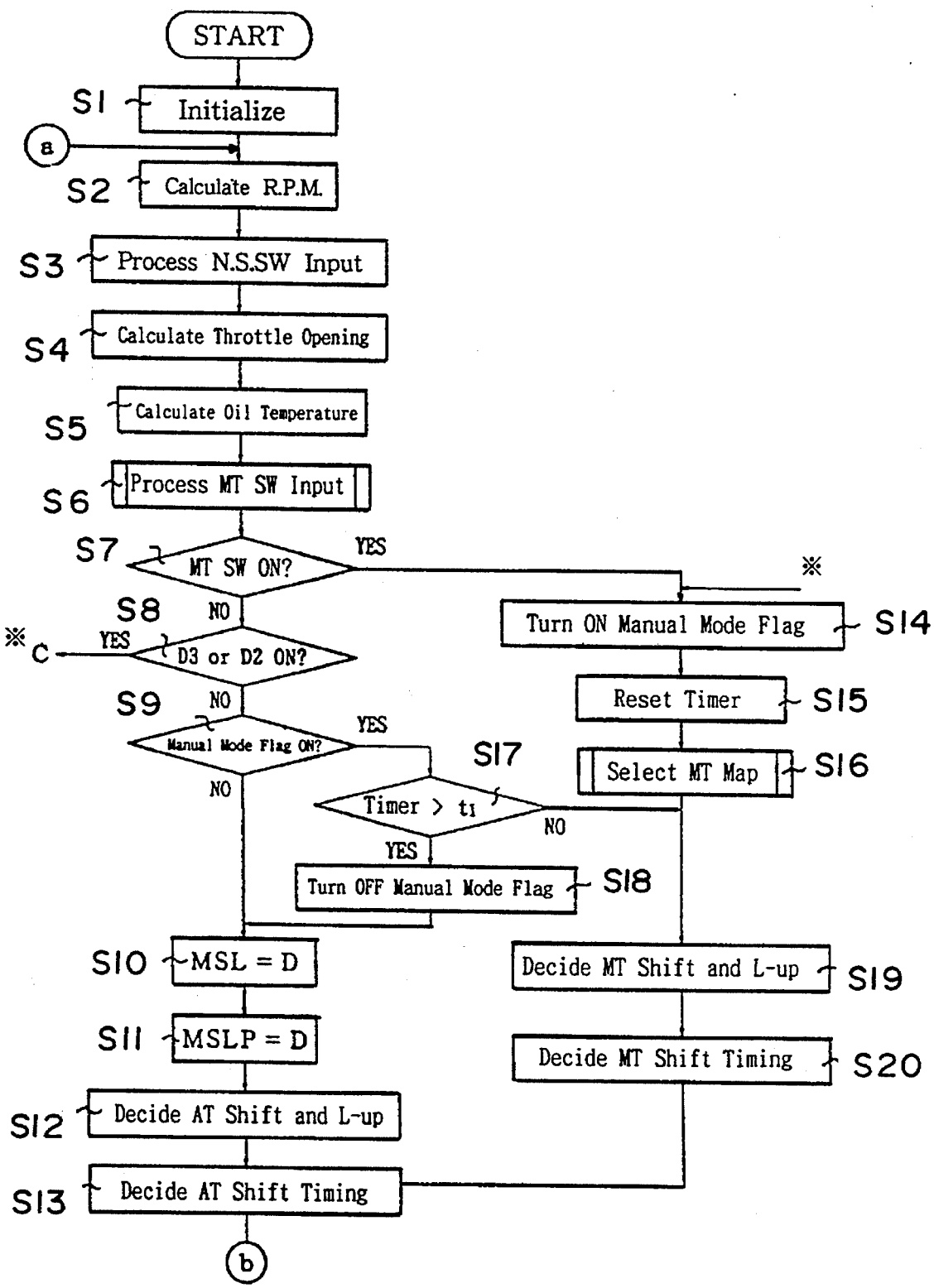
FIG. 10 is a first general flow chart of the control system of the automatic transmission.
Figure 11:
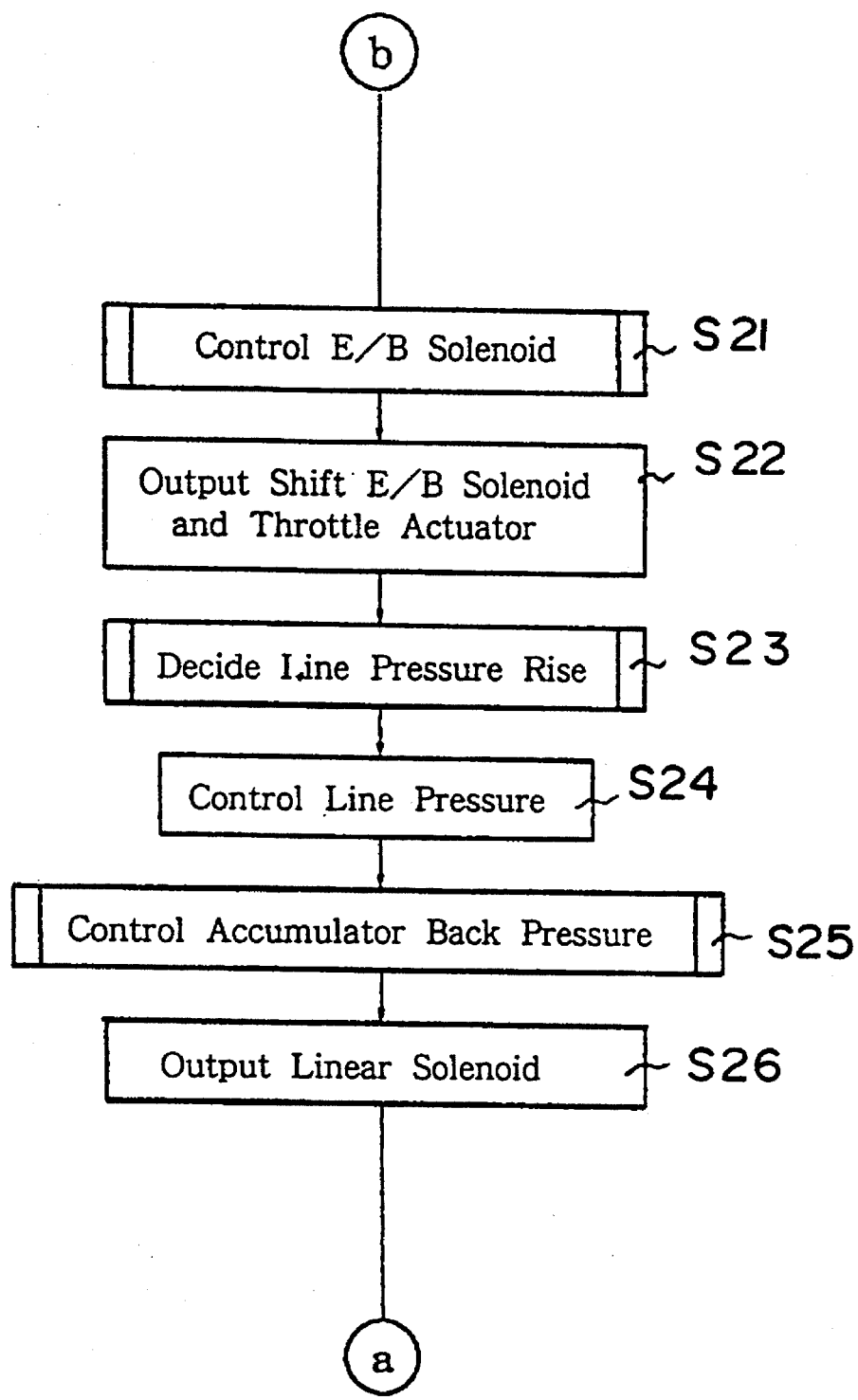
FIG. 11 is a second general flow chart of the control system of the automatic transmission.

Here will be described the operations of the control system according one embodiment of the automatic transmission having the construction thus far described. The general flow of the automatic transmission control system of one embodiment of the present invention will be described with reference to FIG. 10 and FIG. 11.

Step 1: At the start of the program, all conditions are initialized.

Step 2: The R.P.M. of the input shaft 17 and the output shaft 25 of the present transmission are calculated from the signals of the input R.P.M. sensor (or C0 sensor) 43 of the transmission and the vehicle speed sensors SP1 and SP2.

Step 3: The position selected at present by the I-pattern is detected from the signal of the shift position sensor (NSSW) 44 of the automatic transmission. At the same time, the failure of the NSSW is decided.

Step 4: The present throttle opening is calculated from the signal from the throttle opening sensor 46.

Step 5: The present oil temperature (i.e., ATF temperature) of the transmission is calculated from the signal of the oil temperature sensor 46 of the transmission.

Step 6: The shift position of the manual transmission is decided from the signal of the shift position sensor 45 of the manual transmission.

Step 7: It is decided whether or not any of the shift position flags 1 to 4 of the manual transmission is ON. The routine advances to Step 14 if ON but to Step 8 if OFF.

Step 8: It is decided whether or not a $D_2$ signal or a $D_3$ signal is outputted from the brake electronic control unit (i.e., brake ECU). The routine advances to Step 14 if ON but to Step 9 if OFF.

Step 9: It is decided whether or not the manual transmission mode flag is ON (that is, whether or not in the manual transmission mode selected state). The routine advances to Step 17 if ON but to Step 10 if OFF.

Step 10: Automatic transmission data D are read in the automatic transmission shift point data MSL of a shift diagram.

Step 11: The automatic transmission data D are read in the automatic transmission lockup point data MSLP.

Step 12: The shift and the lockup are decided on the basis of the automatic transmission data D read at Steps 10 and 11 and the various running conditions calculated beforehand.

Step 13: The timings for the shift and lockup decisions of Step 12 are decided.

Step 14: If the switches SW1 to SW4 of the shift position sensor 45 are ON at Step 7, the manual transmission mode flag is turned ON to invite the manual transmission mode selected state.

Step 15: The value of an automatic transmission mode restoring timer is reset.

Step 16: The map for the automatic transmission mode is selected, and the various data are read in to enter the subroutine for the manual transmission map selections.

Step 17: If the manual transmission mode flag is ON at Step 9, the value of the automatic transmission restoring timer is compared with a set value t1. The subroutine advances to Step 19 if smaller than the set value t1 but to Step 18 if larger than the set value t1.

Step 18: The manual transmission mode flag is turned OFF, and the routine advances to Step 10 to restore the automatic transmission mode.

Step 19: The shift and the lockup are decided on the basis of the shift data read in the manual transmission map selecting subroutine and the various running conditions calculated beforehand.

Step 20: The timings for the shift decision and the lockup decision made at Step 19 are decided.

Step 21: The engine braking solenoid S3 is controlled and decided by the manual shift position, the output demanded gear stage and so on.

Step 22: According to the decisions of Steps 12 and 13 or Steps 19, 20 and 21, the outputting of the signal to each of the solenoids (S1 to S3) is started, and the throttle actuator is controlled, if necessary.

Step 23: In order to shorten the time lag in the manual transmission mode, the subroutine is temporarily entered for deciding the line pressure rise.

Step 24: The line pressure is controlled according to the throttle opening and is raised by the decision of Step 22.

Step 25: The subroutine for controlling the accumulator back pressure in a predetermined manner is entered for making counter-measures against shocks in the shift transitional state.

Step 26: The individual linear solenoids SLU, SLT and SLN are controlled according to the decisions and controls of Steps 12 and 13 or Steps 19, 20, 24 and 25.

Figure 12:
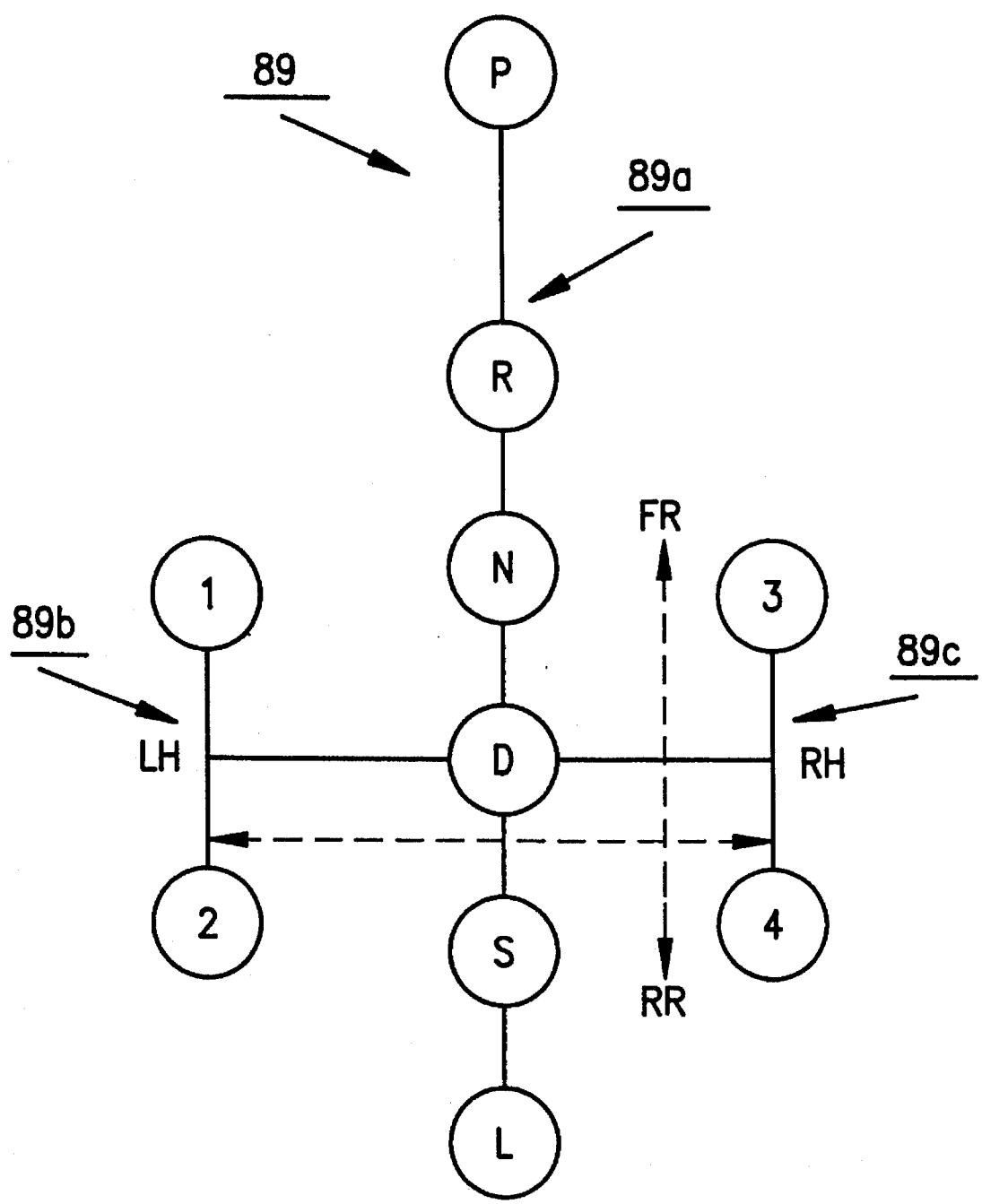
FIG. 12 is a diagram showing a shift pattern of the automatic transmission of the present invention.

With reference to FIG. 12, here will be described a shift pattern in the automatic transmission according to one embodiment of the present invention. Numeral 89 designates a shift pattern, in which: numeral 89a designates an I-pattern; numeral 89b forms part of the H-pattern and designates the low speed shift column, as located at the lefthand side of the I-pattern 89a; and numeral 89c forms part of the H-pattern and designates the high speed shift column, as located at the righthand side of the I-pattern.

Moreover, letters FR, RR, LH and RH designate switches which are arranged in the shift positions corresponding to the respective gear stages of 1st to 4th speeds of the shift position sensor 45. These switches FR, RR, LH and RH are so arranged that they are turned ON when the shift lever is moved to the respective shift positions but OFF when from the shift positions.

Figure 13:
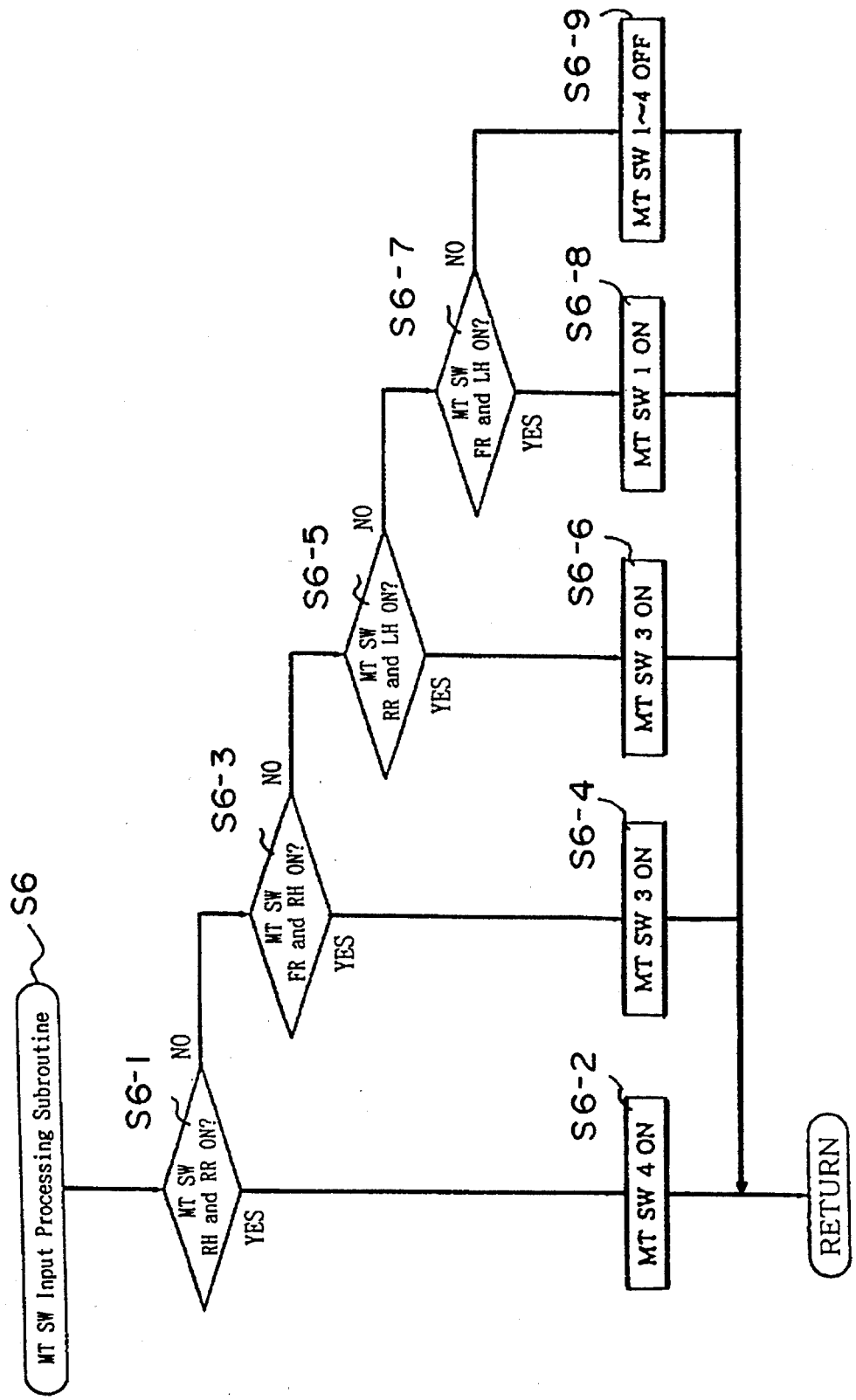
FIG. 13 is a flow chart of a manual shift switch input processing subroutine.

Next, FIG. 13 is a subroutine for the manual shift switch input processing of Step 6. Description will be made with reference to FIG. 14 (i.e., manual switch signal diagram).

Step 6-1: It is decided whether or not the RH and RR of the manual transmission shift position sensor are ON (to select the 4th speed stage of the manual mode) are ON.

Step 6-2: If ON at Step 6-1, the manual transmission switch MT SW4 of the manual transmission shift position flag is turned ON.

Step 6-3: It is decided whether or not the FR and RH of the manual transmission shift position sensor are ON (to select the 3rd speed stage of the manual mode).

Step 6-4: If ON at Step 6-3, the manual transmission switch MT SW3 of the manual transmission shift position flag is turned ON.

Step 6-5: It is decided whether or not the RR and LH of the manual transmission shift position sensor are ON (to select the 2nd speed stage of the manual mode).

Step 6-6: If ON at Step 6-5, the manual transmission switch MT SW2 of the manual transmission shift position flag is turned ON.

Step 6-7: It is decided whether or not the FR and LH of the manual transmission shift position sensor are ON (to select the 1st speed stage of the manual mode).

Step 6-8: If ON at Step 6-7, the manual transmission switch MT SW1 of the manual transmission shift position flag is turned ON.

Step 6-9: If OFF at all Steps 6-1, 6-3, 6-5 and 6-7, all the manual transmission switches MT SW1 to SW4 of the manual transmission shift position flags are turned OFF.

Figure 15:
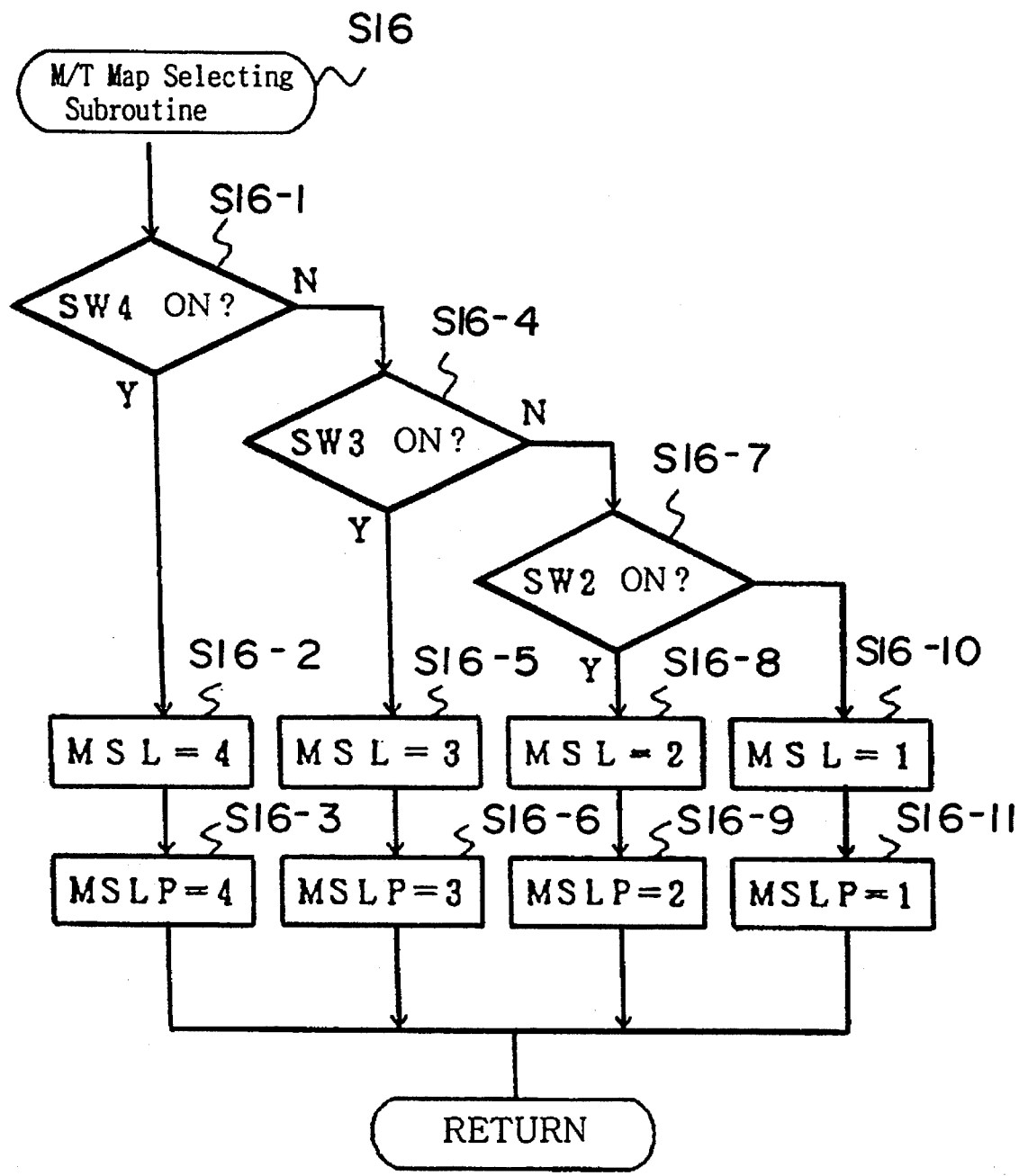
FIG. 15 is a flow chart of a manual shift map selecting subroutine.

With reference to FIG. 15, here will be described the manual transmission map selecting subroutine of Step 16.

Step 16-1: If the $D_3$ signal is ON, the data of the 3rd speed gear stage are read in the MSL and the MSLP irrespective of the deciding conditions of SWn.

Step 16-2: If the $D_2$ signal is ON, the data of the 2nd speed gear stage are read in the MSL and the MSLP irrespective of the deciding conditions of SWn.

Step 16-3: It is decided at the shift position sensor 45 whether or not the 4th speed position switch SW4 is ON.

Step 16-4: If the 4th speed position switch SW4 is ON at Step 16-1, the 4th speed gear stage data are read in the manual transmission shift point data MSL.

Step 16-5: The 4th speed gear data are read in the manual transmission lockup point data MSLP.

Steps 16-6 to 16-8: The 3rd speed gear stage data are read in as at Steps 16-2 to 16-5.

Steps 16-9 to 16-11: The 2nd speed gear stage data are read as at Steps 16-2 to 16-5.

Steps 16-12 & 16-13: The 1st speed gear stage data are read in the manual transmission shift point data MSL and the manual transmission lockup point data MSLP.

Figure 16:
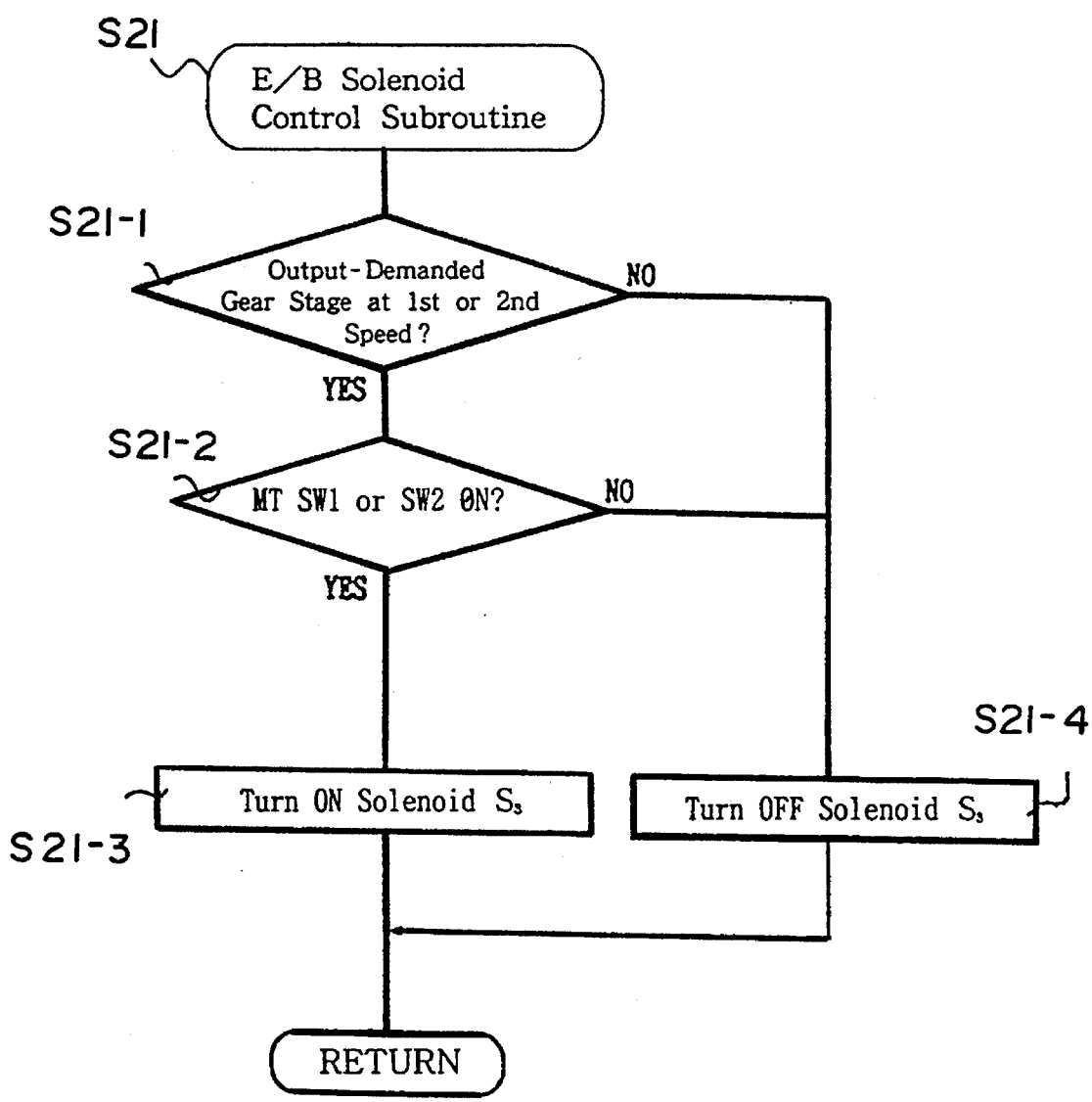
FIG. 16 is a flow chart of an engine braking solenoid control subroutine.

With reference to FIG. 16, here will be described the solenoid controlling subroutine for the engine braking of Step 21.

Step 21-1: It is decided whether or not the output demanded gear stage is at the 1st or 2nd speed. The subroutine advances to Step 21-2, if the answer is YES, but to Step 21-6 if NO.

Step 21-2: It is decided whether or not the shift position 1 or 2 is selected.

Step 21-3: The throttle OFF is decided when the throttle opening inputted at present is 30% or less.

Step 21-4: The input R.P.M. and output R.P.M. of the automatic transmission are compared to decide the start of an inertia phase in the shift transition.

Step 21-5: The solenoid S3 is decided to be ON if all Steps 21-1, -2 and -3 or Steps 21-1, -2 and -4 are satisfied.

Step 21-6: The solenoid S3 is decided to be OFF if the condition of Step 21-5 is not satisfied.

Step 21-7: If the throttle OFF is decided at Step 21-3, it is decided whether the throttle OFF is OFF-up or OFF-down. The subroutine advances to Step 21-5, if the upshift is decided, but to Step 21-8 if the downshift is decided.

Step 21-8: If the OFF-down is decided at Step 21-7, the engine R.P.M. rise control subroutine is entered.

Figure 17:
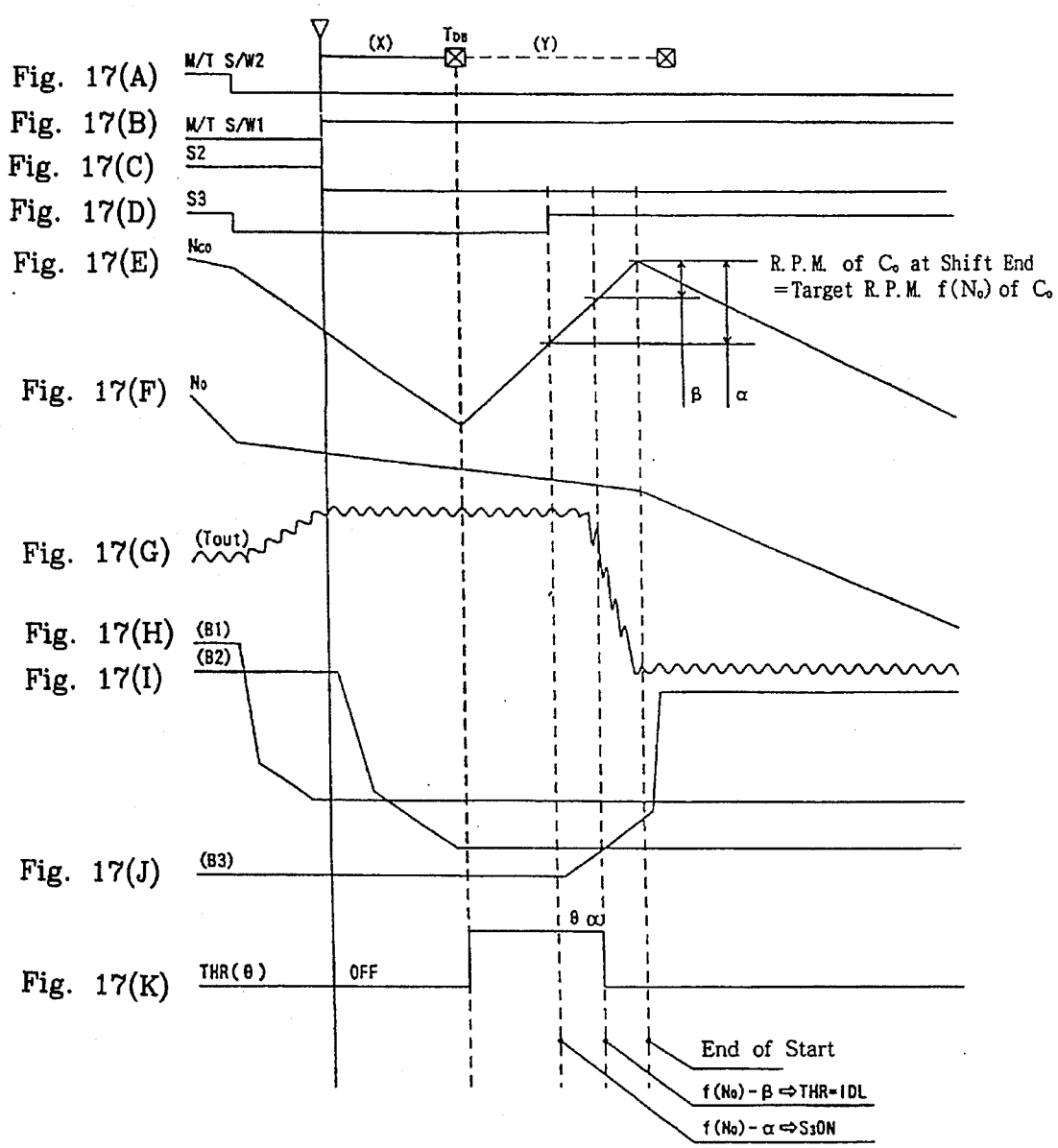
FIG. 17 is a timing chart for a 2-1 downshift of the present invention.

With reference to FIG. 17, here will be described the 2-1 downshift timing chart.

① The manual transmission (M/T) mode shift position starts to leave 2 for 1. When the M/T switch SW2 is turned OFF, the third solenoid S3 is turned OFF to release the 2nd speed engine, braking engagement element B1.

② When the element B1 is released, the vehicle runs idle, and the output torque transits from negative to neutral=0 so that the engine R.P.M. begins to drop to an idle value.

③ The M/T mode shift position 1 holds, and the solenoid S2 is turned from ON to OFF to switch the shift valve thereby to establish the 1st speed state in the hydraulic circuit. The 2nd speed engagement element B2 begins to be released. Simultaneously with this, an engine braking delay timer $T_{DB}$ is started.

④ When the timer time X corresponding to the B2 releasing time has elapsed, the throttle actuator is operated to control the throttle to a specified value θ (X).

⑤ In accordance with the throttle operation, the engine R.P.M. (or C0 R.P.M.) rises. At this time, the output torque does not fluctuate because of idle rotations of the one-way clutch F2 but apparently keeps the neutral state.

⑥ When the C0 R.P.M. takes a difference of α from the target C0 R.P.M. f(N0) calculated from the output shaft R.P.M. and the output demanded gear stage after shifted, the solenoid S3 is turned ON to start application of the 1st speed engine braking engagement element B3.

⑦ When the C0 R.P.M. further rises to take a difference of β from the f(N0), the throttle is returned to the idle state to await the end of engagement of B3 and to instruct the engine ECU of the torque reduction so that the engine output torque may be temporarily reduced to prevent the torsional vibration of the drive system.

⑧ If the C0 R.P.M. cannot be raised for any cause, the throttle control is forcibly ended when the aforementioned timer $T_{DB}$ takes a value Y to restore the idle state.

Figure 18:
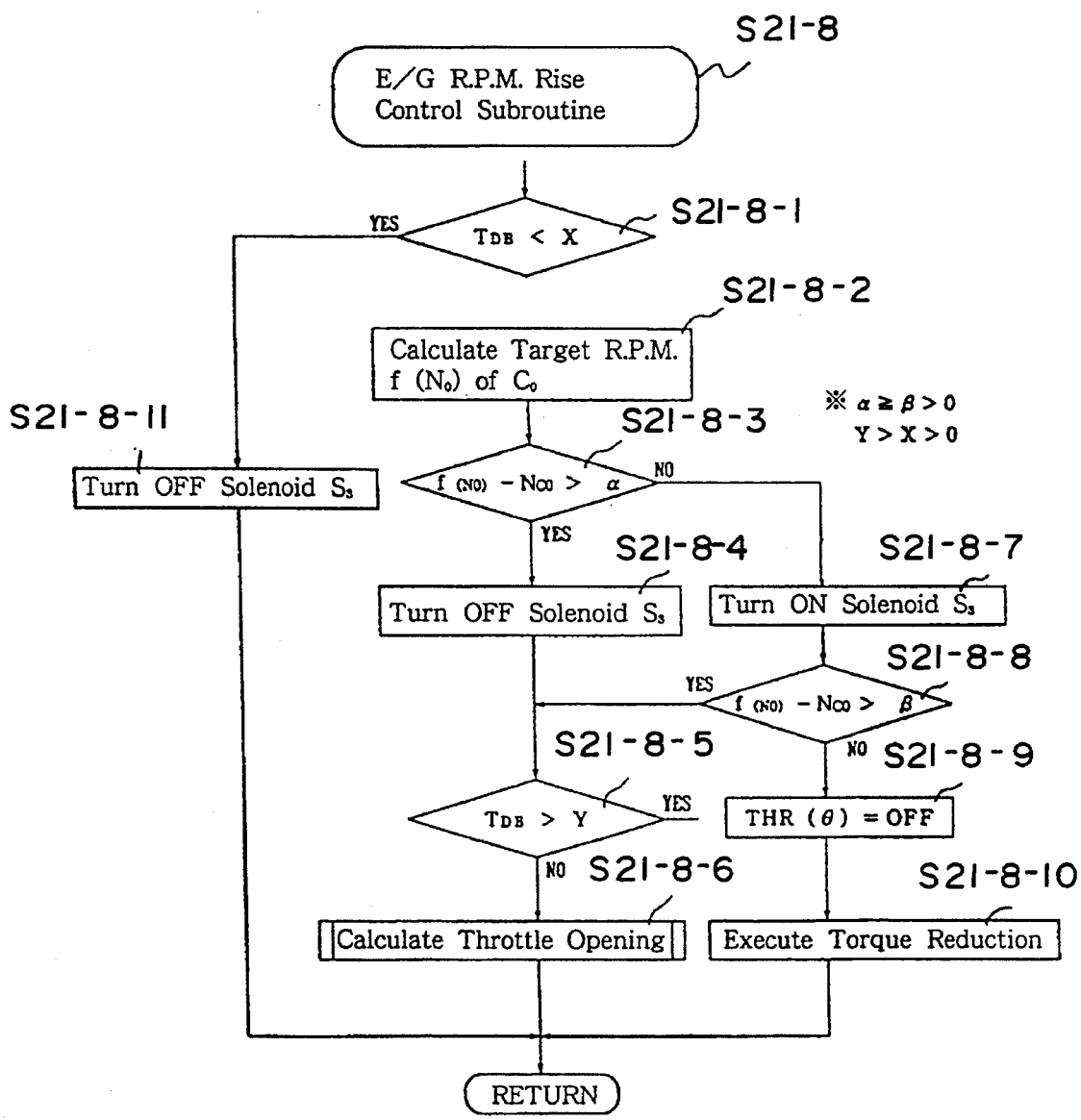
FIG. 18 is a flow chart of an engine R.P.M. rise control subroutine.

With reference to FIG. 18, here will be described the engine R.P.M. rise control subroutine of the aforementioned Step 21-8.

Step 21-8-1: It is decided whether or not the timer $T_{DB}$ for the start of the shift decision is less than the set value X. The subroutine advances to Step 21-8-2, if the timer $T_{DB}$ is less than X, but to Step 21-8-11 if not less than X.

Step 21-8-2: If the timer $T_{DB}$ exceeds the value X, the target C0 R.P.M. f(N0) is calculated from the output R.P.M. and the output demanded gear stage.

Step 21-8-3: It is detected whether or not the difference between the target C0 R.P.M. f(N0) and the present C0 R.P.M. $N_{CO}$ is more than the set value α. The subroutine advances to Step 21-8-4, if more than the value α, but to Step 21-8-7 if less than the value α.

Step 21-8-4: If the Step 21-8-3 holds, the engine braking solenoid $S_3$ is turned OFF.

Step 21-8-5: It is decided whether or not the timer $T_{DB}$ is more than the set value Y. The subroutine advances to Step 21-8-9, if more than the value Y, to prevent the throttle from being left open.

Step 21-8-6: If the timer $T_{DB}$ is less, the throttle opening is calculated from the various conditions, and the subroutine is entered for controlling the throttle actuator.

Step 21-8-7: If Step 21-8-3 fails to hold, the solenoid $S_3$ is turned ON to feed the oil pressure to the engine braking hydraulic servo.

Step 21-8-8: It is decided whether or not the difference between f(N0) and $N_{CO}$ is more than the set value β. The subroutine advances to Step 21-8-5, if more than the value β, but to Step 21-8-9 if less than the value β.

Step 21-8-9: If Step 21-8-8 fails to hold, the throttle is closed to return to the OFF state.

Step 21-8-10: After this throttle OFF, a predetermined torque reduction control is executed to reduce the torsional vibration of the drive system for the engaging operation.

Step 21-8-11: The solenoid $S_3$ is turned OFF if the timer T is less than the set value X at Step 21-8-1.

Figure 19:
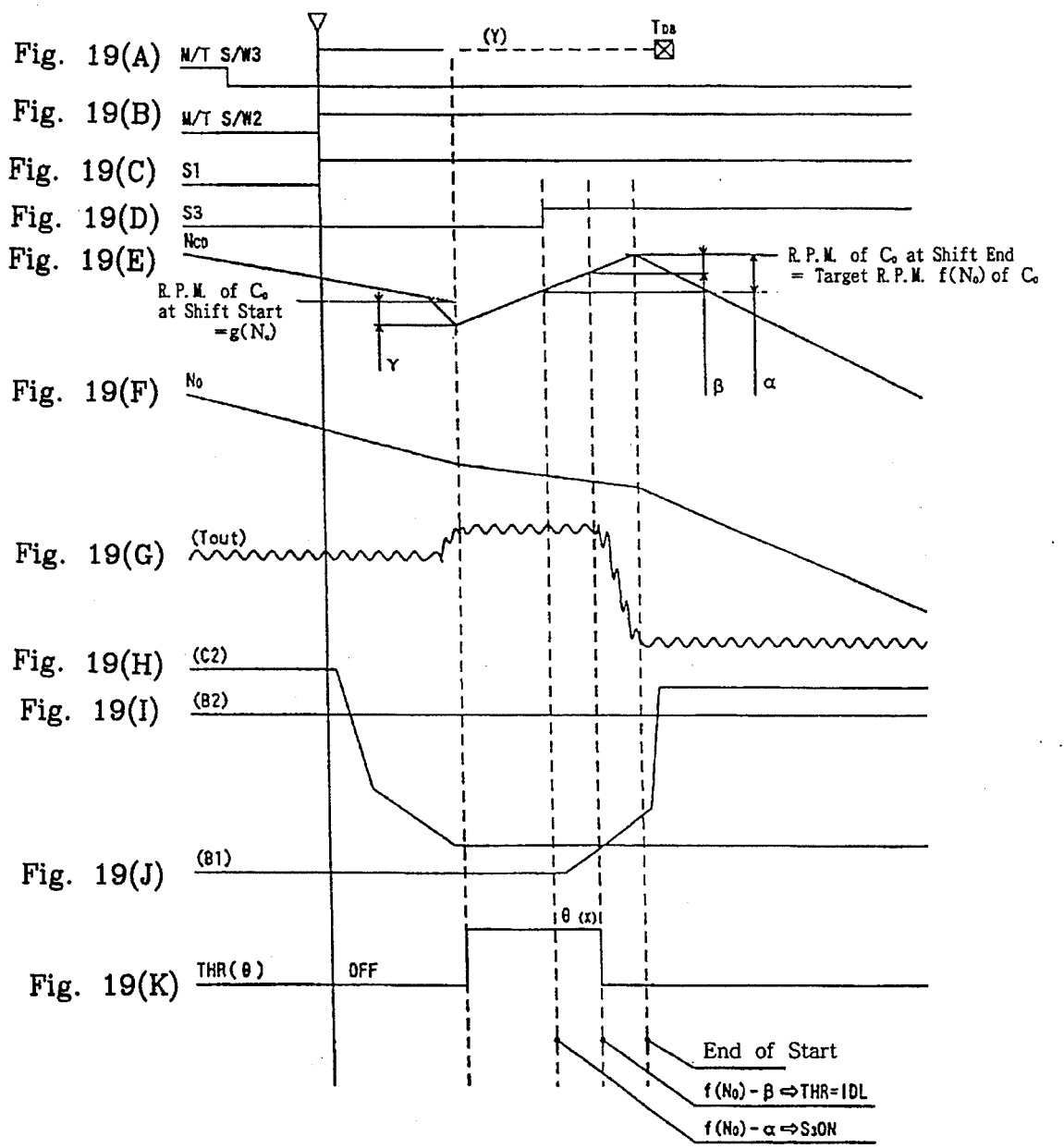
FIG. 19 is a timing chart for a 3-2 downshift of the present invention.
Figure 20:
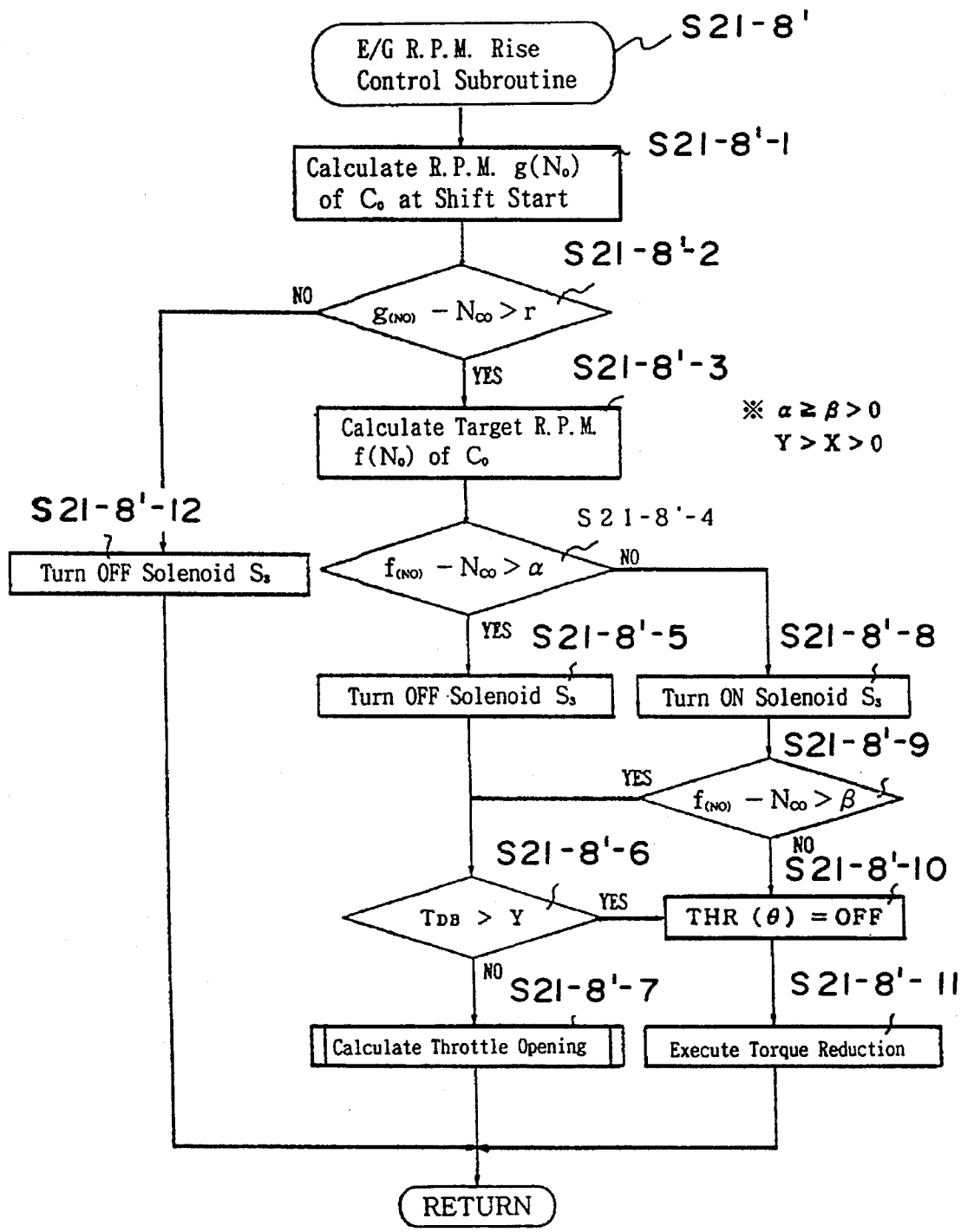
FIG. 20 is a flow chart of a 3-2 downshift of the engine R.P.M. rise control of the present invention.

With reference to FIG. 19, here will be described the timing chart at the 3-2 downshift. Although the engine braking engagement element is disposed at the release side in the case of the 2-1 downshift, the control timings are as follows in case the engine braking engagement element is not disposed at the release side as at the 3-2 downshift.

① The manual transmission (M/T) mode shift position starts to leave 3 for 2. The solenoid S3 is kept OF in case the gear stage before the shift is the 3rd or 4th speed.

② The M/T mode shift position ② holds, the solenoid S1 is switched from OFF to ON so that the shift valve is switched to establish the hydraulic circuit of the 2nd speed. The 3rd speed engagement element C2 begins to be released. Simultaneously with this, the engine brake delay timer $T_{DB}$ is started.

③ When the clement C2 is released, the one-way clutch F1 turns idle so that the engine R.P.M. drops to the idle rotation.

④ When the difference between the C0 R.P.M. g(N0) calculated from the gear stage before the shift and the output shaft 4 and the present C0 R.P.M. $N_{CO}$ exceeds γ, it is decided that the release of the element C2 is ended, and the throttle actuator is operated to control the throttle to a specified value θ (X).

⑤ In accordance with the throttle operation, the engine R.P.M. (or C0 R.P.M.) rises. At this time, the output torque does not fluctuate because of idle rotations of the one-way clutch F1 but apparently keeps the neutral state.

⑥ When the C0 R.P.M. takes a difference of α from the target C0 R.P.M. f(N0) calculated from the output shaft R.P.M. and the output demanded gear stage after shifted, the solenoid S3 is turned ON to start application of the 2ND speed engine braking engagement element B1.

⑦ When the C0 R.P.M. further rises to take a difference of β from the f(N0), the throttle is returned to the idle state to await the end of engagement of the low speed gear stage achieving engagement element B1 and to instruct the engine ECU of the torque reduction so that the engine output torque may be temporarily reduced to prevent the torsional vibration of the drive system.

⑧ If the C0 R.P.M. cannot be raised for any cause, the throttle control is forcibly ended when the aforementioned timer $T_{DB}$ takes a value Y to restore the idle state.

With reference to FIG. 2, here will be described the 3-2 downshift subroutine of the aforementioned engine R.P.M. rise control.

Step 21-8'-1: The $C_O$ R.P.M. g(N0) at the shift starting time is calculated from the output R.P.M. and the gear stage before the shift. Step 21-8'-2: It is decided whether or not the difference between the g(N0) and the present $C_O$ R.P.M. $N_{CO}$ is more than the preset value γ. The subroutine advances to Step 21-8'-3, if more than the value γ, but to Step 21-8'-12 if less than the value γ.

Step 21-8'-3: The target $C_O$ R.P.M. f(N0) is calculated from the output R.P.M. and the output demanded gear stage.

Step 21-8'-4: It is decided whether or not the difference between the target $C_O$ R.P.M. f(N0) and the present $C_O$ R.P.M. $N_{CO}$ is more than the set value α. The subroutine advances to Step 21-8'-12, if more than the value α, but to Step 21-8'-8 if less than the value α.

Step 21-8'-5: The engine braking solenoid $S_3$ is turned OFF if Step 21-8'-4 holds.

Step 21-8'-6: It is decided whether or not the timer $T_{DB}$ is more than the set value Y. If more than the value Y, the subroutine advances to Step 21-8'-10 to prevent the throttle from being left open.

Step 21-8'-7: If the timer $T_{DB}$ is less than the value Y, the throttle opening is calculated from the various conditions, and the subroutine advances for controlling the throttle actuator.

Step 21-8'-8: If Step 21-8'-4 fails to hold, the solenoid $S_3$ is turned ON to feed the oil pressure to the engine braking hydraulic servo.

Step 21-8'-9: It is decided whether or not the difference between the value f(N0) and the value $N_{CO}$ is more than the value β. The subroutine advances to Step 21-8'-6, if more than the value β, but to Step 21-8'-10 if less than the value β.

Step 21-8'-10: If Step 21-8'-9 fails to hold, the throttle is shut to restore the OFF state.

Step 21-8'-11: After this throttle OFF, a predetermined torque reduction control is executed for reducing the torsional vibration of the drive system for the engaging operation.

Step 21-8'-12: If it is decided at Step 21-8'-2 that the difference between the value g(N0) and the present $C_O$ R.P.M. $N_O$ is less than the set value γ, the solenoid $S_3$ is turned OFF.

Figure 21:
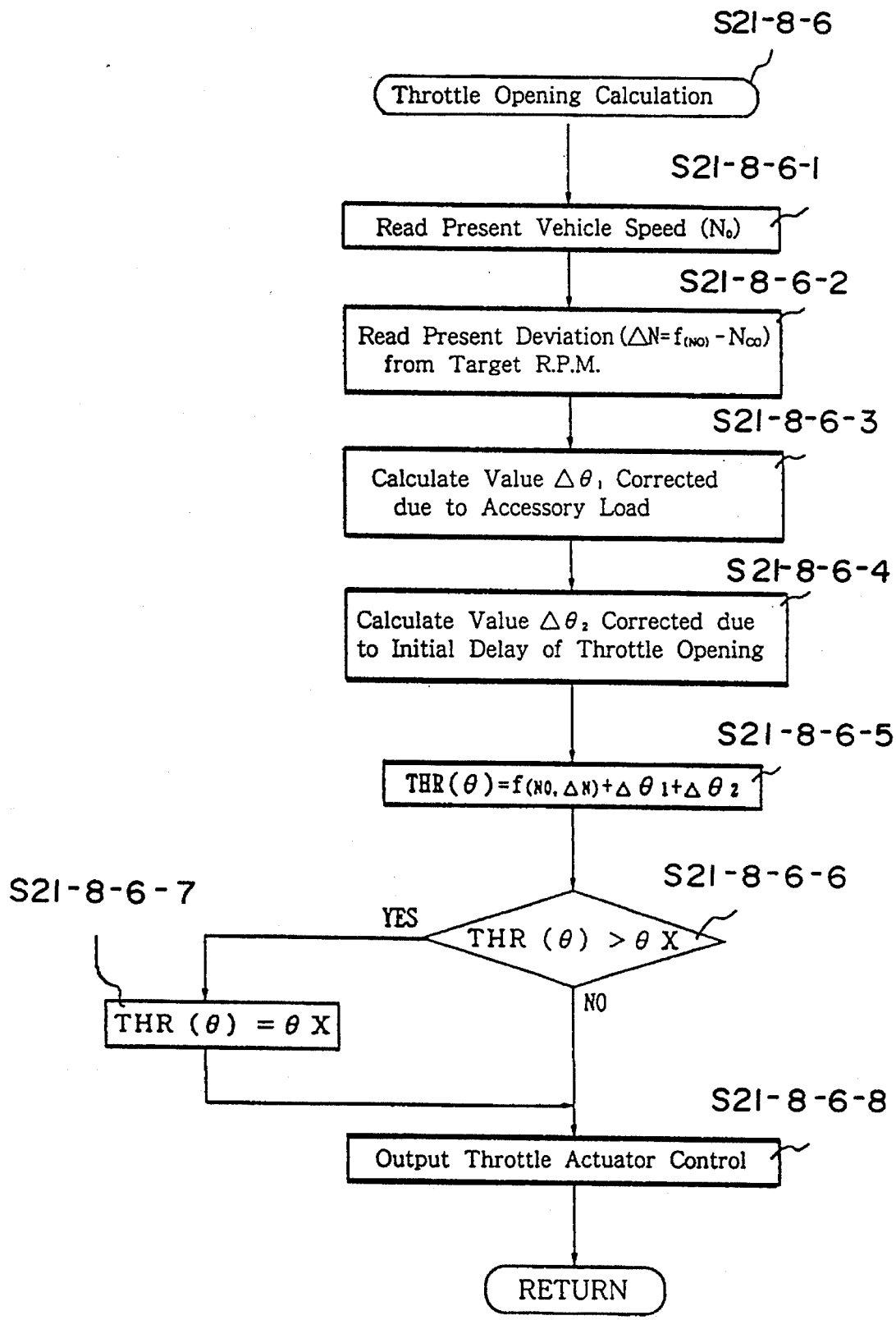
FIG. 21 is a flow chart of a throttle opening calculating subroutine.

With reference to FIG. 21, here will be described the throttle opening calculating subroutine of the aforementioned Step 21-8-6.

Step 21-8-6-1: The vehicle speed $N_O$ calculated in advance from the signal of the output shaft R.P.M. sensor is read in.
Step 21-8-6-2: The target R.P.M. deviation $\Delta N$ calculated by $f(N_O) - N_{CO}$ is read in.
Step 21-8-6-3: The working situations of the engine accessories are confirmed, and the throttle opening corrected value $\Delta\theta_1$ due to the load of the accessories is calculated.
Step 21-8-6-4: The initial opening of the throttle is detected, and the value $\Delta\theta_2$ corrected for the rise delay due to the turbo lag is calculated.
Step 21-8-6-5: The throttle opening $THR(\theta)$ is calculated on the basis of the information obtained from Steps 21-8-6-1 to 4. Alternatively, the throttle opening $THR(\theta)$ is read from a predetermined data map.
Step 21-8-6-6: It is decided whether or not the aforementioned throttle opening $THR(\theta)$ is more than a predetermined throttle opening upper limit $\theta x$.
Step 21-8-6-7: If the value $THR(\theta)$ is more than the upper limit $\theta x$, the former value $THR(\theta)$ is replaced by the latter value $\theta x$.
Step 21-8-6-8: On the basis of the value $THR(\theta)$ determined by the foregoing Steps, the throttle actuator arranged in the engine is operated.

Figure 22:
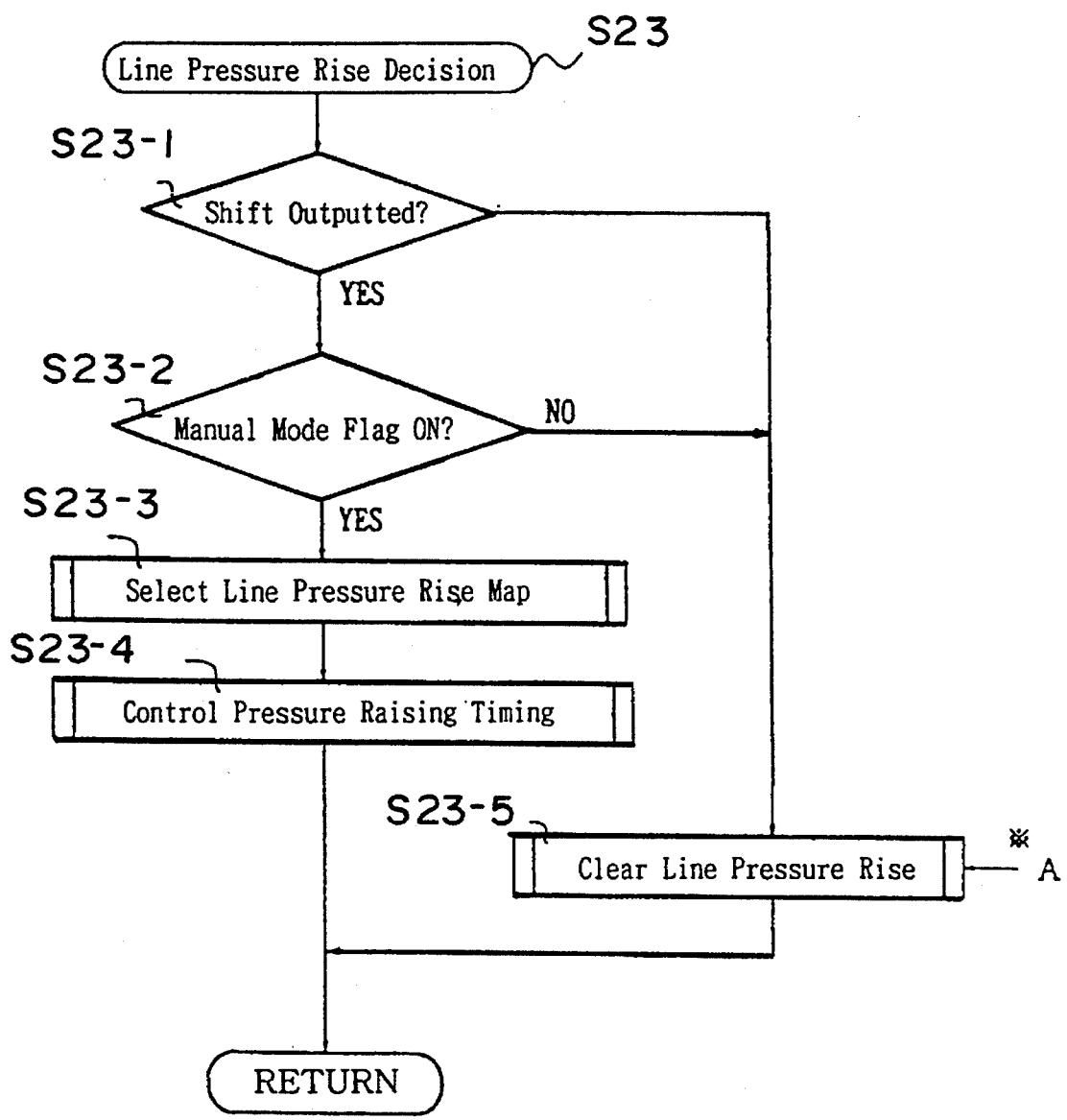
FIG. 22 is a flow chart of a line pressure rise deciding subroutine.

With reference to FIG. 22, here will be described the line pressure rise deciding subroutine of Step 22.
Step 23-1: The present gear stage and the newly demanded gear stage are monitored to decide whether or not the shift is outputted.
Step 23-2: If the shift is outputted at Step 23-1, it is decided whether or not the manual mode flag is ON (that is, whether or not the manual transmission mode is selected).
Step 23-3: If the shift is outputted at Step 23-1 and if the manual mode is ON at Step 23-2, the line pressure rise map selecting subroutine is entered to read the various data on the pressure rise.
Step 23-4: On the basis of the data read at Step 23-3 and the various conditions, the pressure rise timing is determined for the control.
Step 23-5: If the shift is not outputted at Step 23-1 but if the manual mode flag is OFF at Step 23-2, the line pressure rise value is cleared to restore the ordinary control.

Figure 23:
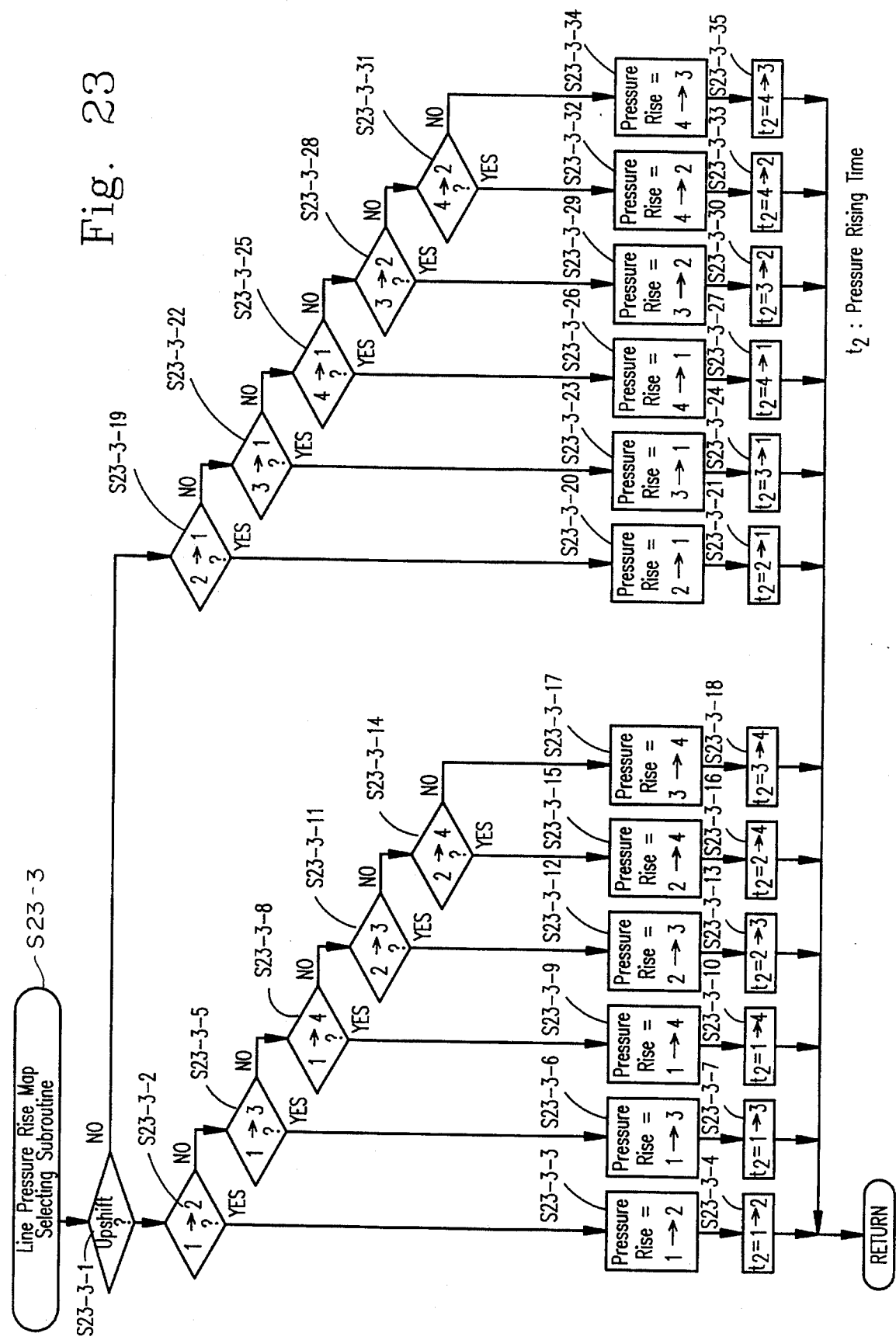
FIG. 23 is a flow chart of a line pressure rise map selecting subroutine.

With reference to FIG. 23, here will be described the subroutine for selecting the line pressure rise map of the aforementioned Step 23.
Step 23-3-1: It is decided whether or not the selected shift is the upshift. The subroutine advances to Step 23-3-2, if in the upshift, but to Step 23-3-19 if in the downshift.
Step 23-3-2: It is decided whether or not the kind of shift selected is the 1-2 upshift.
Step 23-3-3: If the 1-2 upshift is decided at Step 23-3-2, a preset pressure rise 1→2 is read as the data.
Step 23-3-4: If the 1-2 upshift is decided at Step 23-3-2, a preset timer value 1→2 is read as the data at t2.
Steps 23-3-5 to -7: Controls similar those of Step 23-3-2 to 4 are made for the 1-2 upshift.
Steps 23-3-8 to 10: Controls similar those of Step 23-3-2 to -4 are made For the 1-4 upshift.
Steps 23-3-11 to -13: Controls similar those of Step 23-3-2 to -4 are made for the 2-3 upshift.
Steps 23-3-14 to -16: Controls similar those of Step 23-3-2 to -4 are made for the 2-4 upshift.
Steps 23-3-17 & -18: If any of Steps 23-3-2, -5, -8, -11 and -14 fails to hold in the upshift, it is decided that the shift is the 3-4 upshift. Controls similar those of Step 23-3-3 and -4 are made for the 3-4 upshift.
Steps 23-3-19 to -21: If it is decided at Step 23-3-1 that the shift is the downshift, controls similar those of Step 23-3-2 to -4 are made for the 2-1 downshift.
Steps 23-3-22 to -24: Controls similar those of Step 23-3-2 to -4 are made for the 3-1 downshift.
Steps 23-3-25 to -27: Controls similar those of Step 23-3-2 to -4 are made for the 4-1 downshift.
Steps 23-3-28 to -30: Controls similar those of Step 23-3-2 to -4 are made for the 3-2 downshift.
Steps 23-3-31 to -33: Controls similar those of Step 23-3-2 to -4 are made for the 4-2 downshift.
Steps 23-3-34 & -35: If any of Steps 23-3-19, -22, -25, -28 and -31 fails to hold in the downshift, it is decided that the shift is the 4-3 downshift. Controls similar those of Step 23-3-3 and -4 are made for the 4-3 upshift.

Figure 24:
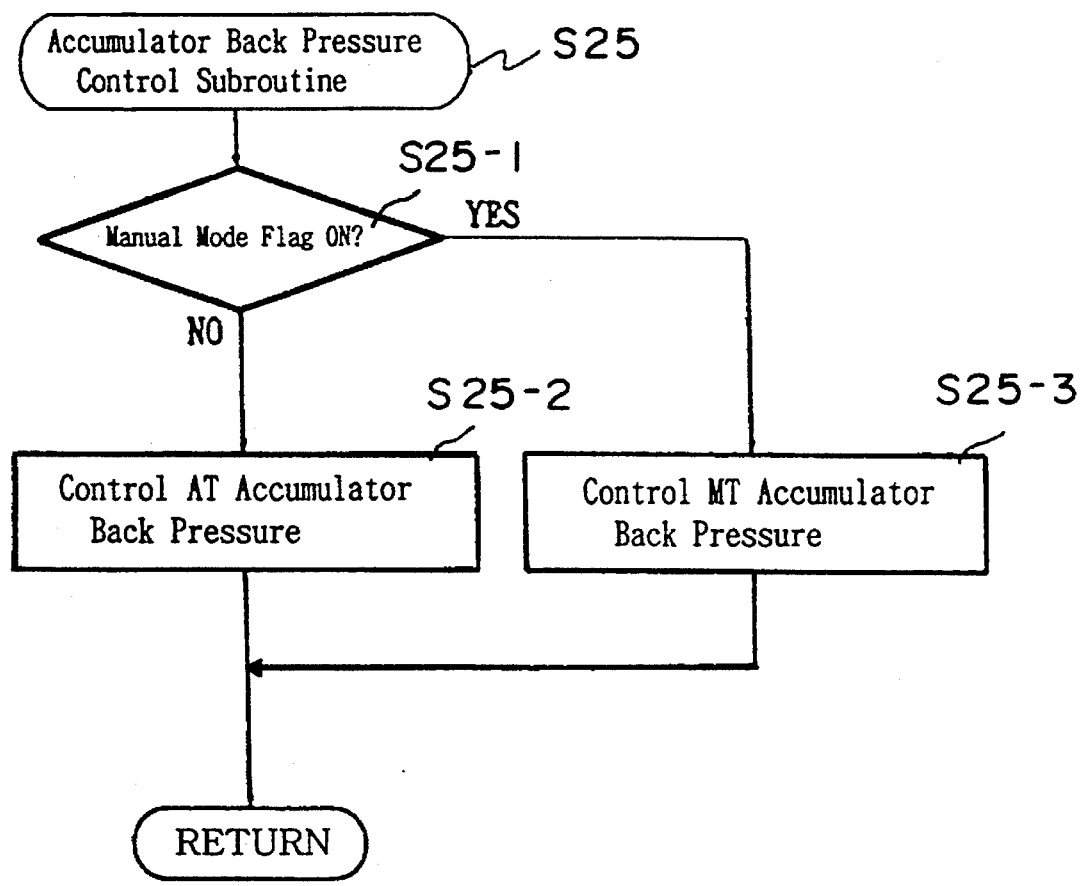
FIG. 24 is a flow chart of an accumulator back pressure control subroutine.

With reference to FIG. 24, here will be described the accumulator back pressure control subroutine.
Step 25-1: It is decided whether or not the manual mode flag is ON (that is, whether or not the manual transmission mode is selected).
Step 25-2: If the manual mode flag is OFF at Step 25-1, the accumulator back pressure control is made according to the automatic transmission mode control.
Step 25-3: If the manual mode flag is ON at Step 25-1, the accumulator back pressure control is made according to the manual transmission mode control.

Figure 25:
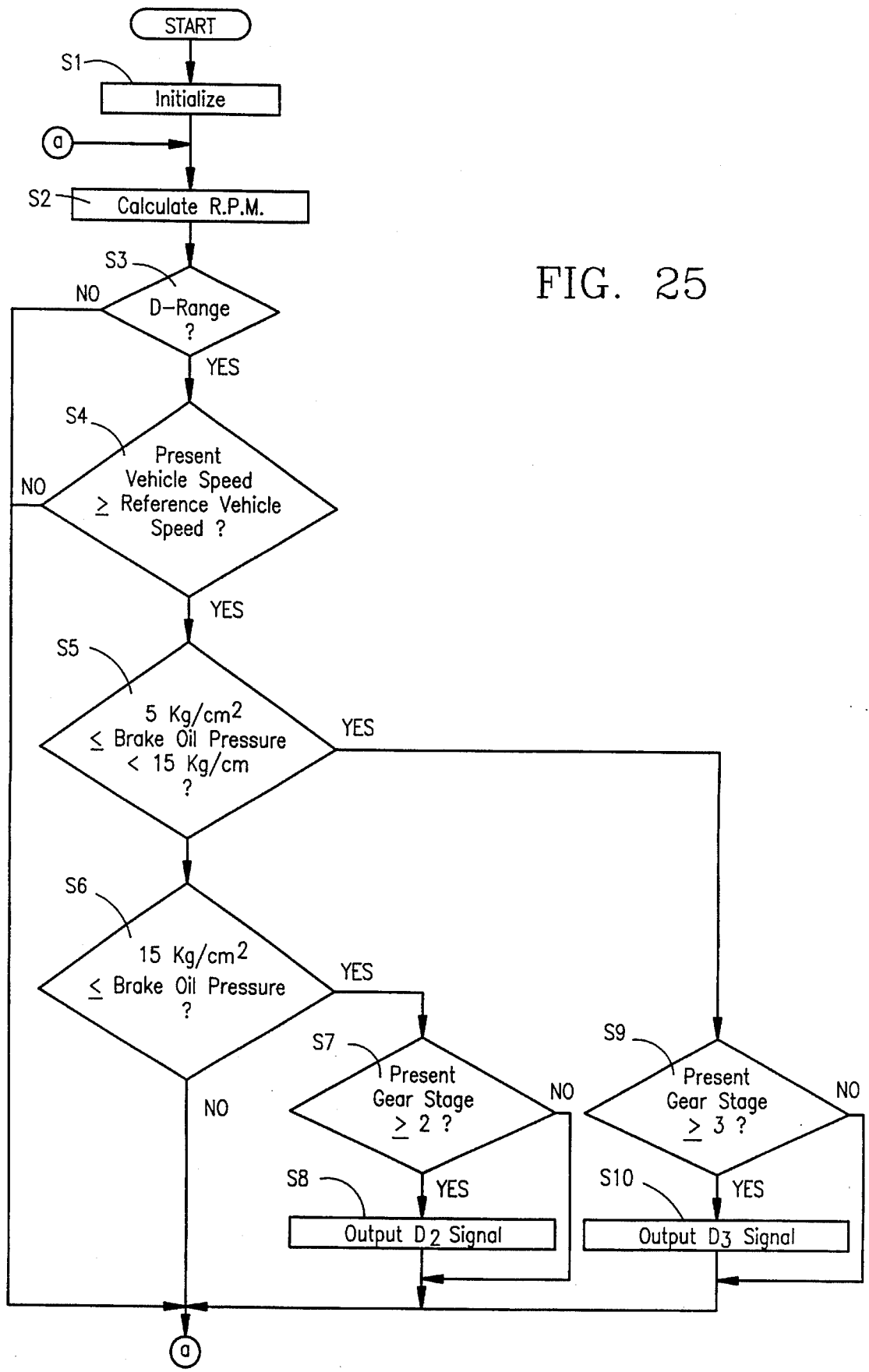
FIG. 25 is a basic flow chart for deciding a brake ECU shiftdown.

With reference to FIG. 25, here will be described the basic flow chart for deciding the brake ECU shiftdown.
Step 1: At the start of the program, all the conditions are initialized.
Step 2: The present transmission input shaft and output shaft R.P.M. are calculated in response to the signals of the transmission input R.P.M. sensor (or C0 R.P.M. sensor) and the vehicle speed sensors (SP1 and SP2).
Step 3: It is decided whether or not the vehicle is running in the present D-range, in response to signals of the automatic transmission (A/T) shift position sensor (NSSW) and the manual transmission (M/T) shift position sensor.
Step 4: It is decided whether or not the present vehicle speed is higher than the preset downshift control reference vehicle speed.
Step 5: In response to the signal of the brake oil pressure sensor, it is decided whether or not the brake oil pressure is within a range from 5 $Kg/(cm)^2$ to 15 $Kg/(cm)^2$.
Step 6: In response to the signal of the brake oil pressure sensor, it is decided whether or not the brake oil pressure is higher than 15 $Kg/(cm)^2$.
Step 7: If the Step 6 holds, it is decided whether or not the present gear stage is at the 2nd speed or higher.
Step 8: If Steps 6 and 7 hold, the "$D_2$" signal is outputted to instruct the automatic transmission (A/T) ECU of the downshift to the 2nd speed.
Step 9: If Step 5 holds, it is decided whether or not the present gear stage is at the 3rd speed or higher.
Step 10: If Steps 5 and 9 hold the "$D_3$" signal is outputted to instruct the automatic transmission (A/T) ECU of a downshift to the 3rd speed.

We claim:
1. A shift control system for a vehicular automatic transmission, comprising:
   release end detecting means for detecting the release end of a frictional engagement element for a higher gear stage, at a shifting time from higher to lower gear stages;
   synchronism detecting means for detecting the synchronism between an engine R.P.M. and a rotating element in the automatic transmission at the lower gear stage; and
   engine output control means for controlling the output of the engine, wherein said engine output control means starts the rise control of the engine output, when the release end of the Frictional engagement element for the higher gear stage is detected by said release end detecting means, and ends the rise control of said engine output when the synchronism between the engine R.P.M. and the rotating element in the automatic transmission at the lower gear stage is detected by said synchronism detecting means.

2. A shift control system for a vehicular automatic transmission as set forth in claim 1, wherein the lower gear stage is established in the drive state when the frictional engagement element for said higher gear stage is released.

3. A shift control system for a vehicular automatic transmission as set forth in claim 1, the engagement of the frictional engagement element for the lower gear stage is started by detecting the synchronism by said synchronism detecting means.

4. A shift control system for a vehicular automatic transmission as set forth in claim 3, wherein said release end detecting means decides the release end of the frictional engagement element for the higher gear stage when the difference between the input shaft R.P.M. and a target R.P.M. determined from the output shaft R.P.M. and the gear ratio is more than a predetermined value, and wherein said synchronism detecting means decides said synchronism when the difference between the input shaft R.P.M. and the target R.P.M. determined from the output R.P.M. and the gear ratio is less than a first predetermined value.

5. A shift control system for a vehicular automatic transmission as set forth in claim 4, wherein the fractional engagement clement for the lower gear stage is applied when the difference between the input shaft R.P.M. and the target R.P.M. determined from the output shaft R.P.M. and the gear ratio is less than a second predetermined value larger than said first predetermined value.

6. A shift control system for a vehicular automatic transmission as set forth in claim 3, wherein said release end detecting means decides the release of the frictional engagement element for the higher gear stage after a predetermined time period has elapsed from the output of a shift signal, and wherein said synchronism detecting means detects the synchronism when the rotational difference between the input shaft R.P.M. and the target rotation determined from the output R.P.M. and the gear ratio is more than a first predetermined value.

* * * * *

UNITED STATES PATENT AND TRADEMARK OFFICE
CERTIFICATE OF CORRECTION

PATENT NO. : 5,501,642                      Page 1 of 5
DATED      : March 26, 1996
INVENTOR(S): INUZUKA et al It is certified that error appears in the above-indentified patent and that said Letters Patent is hereby corrected as shown below:

Col. 6, line 36, "S7" should read --57--.

Col. 8, line 57, "S8" should read --S3--.

Col. 9, line 35, "OF" should read --OFF--.

Col. 11, line 28, after "when" insert --moved--; and line 29, "positions" should read --position--.

Col. 13, line 53, "OF" should read --OFF--.

Col. 15, line 57, "For" should read --for--.

Col. 16, delete lines 55-67.

Col. 17, delete lines 1-9 and substitute therefor the following:

--1. A shift control system for a vehicular automatic transmission, in which the application of a frictional engagement element for a lower gear stage is started at the time of shifting from a higher to a lower gear stage after the release of a frictional engagement element for the higher gear

UNITED STATES PATENT AND TRADEMARK OFFICE
CERTIFICATE OF CORRECTION

PATENT NO. : 5,501,642            PAGE 2 of 5
DATED      : March 26, 1996
INVENTOR(S): INUZUKA et al It is certified that error appears in the above-indentified patent and that said Letters Patent is hereby corrected as shown below:

stage has been completed, comprising:

release end detecting means for detecting completion of release of the frictional engagement element for the higher gear stage, at said time of shifting;

synchronism detecting means for detecting synchronism between engine R.P.M. and R.P.M. of a rotating element in the automatic transmission at the lower gear stage; and engine output control means for controlling the output of the engine, said engine output control means starting a rise of engine output responsive to detection of completion of release of the frictional engagement element for the higher gear stage and ending the rise of said engine output responsive to detection of synchronism between the engine R.P.M. and the R.P.M. of the rotating element in the automatic transmission at the lower gear stage.--

UNITED STATES PATENT AND TRADEMARK OFFICE
CERTIFICATE OF CORRECTION

PATENT NO. : 5,501,642  PAGE 3 OF 5
DATED : March 26, 1996
INVENTOR(S) : INUZUKA et al It is certified that error appears in the above-indentified patent and that said Letters Patent is hereby corrected as shown below:

Column 17 and 18, delete claims 3-6 and substitute the following:

--3. A shift control system for a vehicular automatic transmission as set forth in claim 1, wherein the engagement of the frictional engagement element for the lower gear stage is started responsive to detection of the synchronism by said synchronism detecting means.

4. A shift control system for a vehicular automatic transmission as set forth in claim 3, said vehicular automatic transmission having an input shaft and an output shaft and means for measuring the R.P.M.'s of said shafts, and wherein said release end detecting means decides the completion of release of the frictional engagement element for the higher gear stage when the difference between the input shaft R.P.M. and a target R.P.M., determined from the output shaft R.P.M.

UNITED STATES PATENT AND TRADEMARK OFFICE
CERTIFICATE OF CORRECTION

PATENT NO. : 5,501,642
DATED : March 26, 1996
INVENTOR(S) : INUZUKA et al

It is certified that error appears in the above-indentified patent and that said Letters Patent is hereby corrected as shown below:

and the gear ratio, is more than a first predetermined value, and wherein said synchronism detecting means decides said synchronism when the difference between the input shaft R.P.M. and the target R.P.M., determined from the output R.P.M. and the gear ratio, is less than a second predetermined value.--.

--5. A shift control system for a vehicular automatic transmission as set forth in claim 4, wherein the frictional engagement element for the lower gear stage is applied when the difference between the input shaft R.P.M. and the target R.P.M., determined from the output shaft R.P.M. and the gear ratio, is less than a third predetermined value larger than said second predetermined value.

UNITED STATES PATENT AND TRADEMARK OFFICE
CERTIFICATE OF CORRECTION

PATENT NO. : 5,501,642
DATED : March 26, 1996
INVENTOR(S) : INUZUKA et al

It is certified that error appears in the above-indentified patent and that said Letters Patent is hereby corrected as shown below:

6. A shift control system for a vehicular automatic transmission as set forth in claim 3, wherein said release end detecting means decides completion of the release of the frictional engagement element for the higher gear stage upon lapse of a predetermined time period from the output of a shift signal, and wherein said synchronism detecting means detects as the synchronism a R.P.M. difference between the input shaft R.P.M. and a target R.P.M., determined from the output R.P.M. and the gear ratio, which exceeds a predetermined value.--.

Signed and Sealed this

Fifteenth Day of April, 1997

*Attest:*

BRUCE LEHMAN

*Attesting Officer*     *Commissioner of Patents and Trademarks*